(12) United States Patent
Aleem et al.

(10) Patent No.: US 10,684,692 B2
(45) Date of Patent: *Jun. 16, 2020

(54) SYSTEMS, DEVICES, AND METHODS FOR GESTURE IDENTIFICATION

(71) Applicant: Facebook Technologies, LLC, Menlo Park, CA (US)

(72) Inventors: Idris S. Aleem, Pickering (CA); Pedram Ataee, Waterloo (CA)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/852,196

(22) Filed: Dec. 22, 2017

(65) Prior Publication Data

US 2018/0120948 A1    May 3, 2018

Related U.S. Application Data

(63) Continuation of application No. 14/737,081, filed on Jun. 11, 2015, now Pat. No. 9,880,632.

(Continued)

(51) Int. Cl.
*G06F 3/01* (2006.01)
*G06F 1/16* (2006.01)
(Continued)

(52) U.S. Cl.
CPC .............. *G06F 3/017* (2013.01); *G06F 1/163* (2013.01); *G06F 3/015* (2013.01); *G06K 9/00335* (2013.01); *G06K 9/6202* (2013.01)

(58) Field of Classification Search
CPC ............................ G06F 3/017; G06K 9/00335
See application file for complete search history.

(56) References Cited

U.S. PATENT DOCUMENTS 1,411,995 A    4/1922    Dull
3,408,133 A    10/1968   Lee
(Continued)

FOREIGN PATENT DOCUMENTS

CA    2902045 A1    8/2014
CA    2921954 A1    2/2015
(Continued)

OTHER PUBLICATIONS

Brownlee, "Finite State Machines (FSM): Finite state machines as a control technique in Artificial Intelligence (AI)," Jun. 2002, 12 pages.

(Continued)

*Primary Examiner* — Kent W Chang
*Assistant Examiner* — Chayce R Bibbee
(74) *Attorney, Agent, or Firm* — FisherBroyles, LLP

(57) ABSTRACT

Systems, devices, and methods adapt established concepts from natural language processing for use in gesture identification algorithms. A gesture identification system includes sensors, a processor, and a non-transitory processor-readable memory that stores data and/or instructions for performing gesture identification. A gesture identification system may include a wearable gesture identification device. The gesture identification process involves segmenting signals from the sensors into data windows, assigning a respective "window class" to each data window, and identifying a user-performed gesture based on the corresponding sequence of window classes. Each window class exclusively characterizes at least one data window property and is analogous to a "letter" of an alphabet. Under this model, each gesture is analogous to a "word" made up of a particular combination of window classes.

39 Claims, 5 Drawing Sheets

Related U.S. Application Data

(60) Provisional application No. 62/014,605, filed on Jun. 19, 2014.

(51) Int. Cl.
*G06K 9/00* (2006.01)
*G06K 9/62* (2006.01)

(56) References Cited

U.S. PATENT DOCUMENTS

| | | |
|---|---|---|
| 3,620,208 A | 11/1971 | Higley et al. |
| 3,712,716 A | 1/1973 | Cornsweet et al. |
| 3,880,146 A | 4/1975 | Everett et al. |
| 4,055,168 A | 10/1977 | Miller et al. |
| 4,602,639 A | 7/1986 | Hoogendoorn et al. |
| 4,705,408 A | 11/1987 | Jordi |
| 4,817,064 A | 3/1989 | Milles |
| 4,896,120 A | 1/1990 | Kamil |
| 4,978,213 A | 12/1990 | El Hage |
| 5,003,978 A | 4/1991 | Dunseath, Jr. |
| D322,227 S | 12/1991 | Warhol |
| 5,081,852 A | 1/1992 | Cox |
| 5,103,323 A | 4/1992 | Magarinos et al. |
| 5,231,674 A | 7/1993 | Cleveland et al. |
| 5,251,189 A | 10/1993 | Thorp |
| D348,660 S | 7/1994 | Parsons |
| 5,445,869 A | 8/1995 | Ishikawa et al. |
| 5,467,104 A | 11/1995 | Furness, III et al. |
| 5,482,051 A | 1/1996 | Reddy et al. |
| 5,589,956 A | 12/1996 | Morishima et al. |
| 5,596,339 A | 1/1997 | Furness, III et al. |
| 5,605,059 A | 2/1997 | Woodward |
| 5,625,577 A | 4/1997 | Kunii et al. |
| 5,683,404 A | 11/1997 | Johnson |
| 5,742,421 A | 4/1998 | Wells et al. |
| 6,005,548 A | 12/1999 | Latypov et al. |
| 6,008,781 A | 12/1999 | Furness, III et al. |
| 6,009,210 A | 12/1999 | Kang |
| 6,027,216 A | 2/2000 | Guyton et al. |
| 6,032,530 A | 3/2000 | Hock |
| D422,617 S | 4/2000 | Simioni |
| 6,184,847 B1 | 2/2001 | Fateh et al. |
| 6,236,476 B1 | 5/2001 | Son et al. |
| 6,238,338 B1 | 5/2001 | DeLuca et al. |
| 6,244,873 B1 | 6/2001 | Hill et al. |
| 6,317,103 B1 | 11/2001 | Furness, III et al. |
| 6,377,277 B1 | 4/2002 | Yamamoto |
| D459,352 S | 6/2002 | Giovanniello |
| 6,411,843 B1 | 6/2002 | Zarychta |
| 6,487,906 B1 | 12/2002 | Hock |
| 6,510,333 B1 | 1/2003 | Licata et al. |
| 6,527,711 B1 | 3/2003 | Stivoric et al. |
| 6,619,836 B1 | 9/2003 | Silvant et al. |
| 6,639,570 B2 | 10/2003 | Furness, III et al. |
| 6,658,287 B1 | 12/2003 | Litt et al. |
| 6,720,984 B1 | 4/2004 | Jorgensen et al. |
| 6,743,982 B2 | 6/2004 | Biegelsen et al. |
| 6,774,885 B1 | 8/2004 | Even-Zohar |
| 6,807,438 B1 | 10/2004 | Brun del Re et al. |
| D502,661 S | 3/2005 | Rapport |
| D502,662 S | 3/2005 | Rapport |
| 6,865,409 B2 | 3/2005 | Getsla et al. |
| D503,646 S | 4/2005 | Rapport |
| 6,880,364 B1 | 4/2005 | Vidolin et al. |
| 6,927,343 B2 | 8/2005 | Watanabe et al. |
| 6,942,621 B2 | 9/2005 | Avinash et al. |
| 6,965,842 B2 | 11/2005 | Rekimoto |
| 6,972,734 B1 | 12/2005 | Ohshima et al. |
| 6,984,208 B2 | 1/2006 | Zheng |
| 7,022,919 B2 | 4/2006 | Brist et al. |
| 7,028,507 B2 | 4/2006 | Rapport |
| 7,086,218 B1 | 8/2006 | Pasach |
| 7,089,148 B1 | 8/2006 | Bachmann et al. |
| D535,401 S | 1/2007 | Travis et al. |
| 7,173,437 B2 | 2/2007 | Hervieux et al. |
| 7,209,114 B2 | 4/2007 | Radley-Smith |
| D543,212 S | 5/2007 | Marks |
| 7,265,298 B2 | 9/2007 | Maghribi et al. |
| 7,271,774 B2 | 9/2007 | Puuri |
| 7,333,090 B2 | 2/2008 | Tanaka et al. |
| 7,351,975 B2 | 4/2008 | Brady et al. |
| 7,450,107 B2 | 11/2008 | Radley-Smith |
| 7,473,888 B2 | 1/2009 | Wine et al. |
| 7,491,892 B2 | 2/2009 | Wagner et al. |
| 7,517,725 B2 | 4/2009 | Reis |
| 7,558,622 B2 | 7/2009 | Tran |
| 7,574,253 B2 | 8/2009 | Edney et al. |
| 7,580,742 B2 | 8/2009 | Tan et al. |
| 7,596,393 B2 | 9/2009 | Jung et al. |
| 7,618,260 B2 | 11/2009 | Daniel et al. |
| 7,636,549 B2 | 12/2009 | Ma et al. |
| 7,640,007 B2 | 12/2009 | Chen et al. |
| 7,660,126 B2 | 2/2010 | Cho et al. |
| 7,684,105 B2 | 3/2010 | Lamontagne et al. |
| 7,747,113 B2 | 6/2010 | Mukawa et al. |
| 7,773,111 B2 | 8/2010 | Cleveland et al. |
| 7,787,946 B2 | 8/2010 | Stahmann et al. |
| 7,805,386 B2 | 9/2010 | Greer |
| 7,809,435 B1 | 10/2010 | Ettare et al. |
| 7,844,310 B2 | 11/2010 | Anderson |
| D628,616 S | 12/2010 | Yuan |
| 7,850,306 B2 | 12/2010 | Uusitalo et al. |
| 7,870,211 B2 | 1/2011 | Pascal et al. |
| D633,939 S | 3/2011 | Puentes et al. |
| D634,771 S | 3/2011 | Fuchs |
| 7,901,368 B2 | 3/2011 | Flaherty et al. |
| 7,925,100 B2 | 4/2011 | Howell et al. |
| 7,948,763 B2 | 5/2011 | Chuang |
| D640,314 S | 6/2011 | Yang |
| D643,428 S | 8/2011 | Janky et al. |
| D646,192 S | 10/2011 | Woode |
| D649,177 S | 11/2011 | Cho et al. |
| 8,054,061 B2 | 11/2011 | Prance et al. |
| D654,622 S | 2/2012 | Hsu |
| 8,120,828 B2 | 2/2012 | Schwerdtner |
| 8,170,656 B2 | 5/2012 | Tan et al. |
| 8,179,604 B1 | 5/2012 | Prada Gomez et al. |
| 8,188,937 B1 | 5/2012 | Amafuji et al. |
| 8,190,249 B1 | 5/2012 | Gharieb et al. |
| D661,613 S | 6/2012 | Demeglio |
| 8,203,502 B1 | 6/2012 | Chi et al. |
| 8,207,473 B2 | 6/2012 | Axisa et al. |
| 8,212,859 B2 | 7/2012 | Tang et al. |
| D667,482 S | 9/2012 | Healy et al. |
| D669,522 S | 10/2012 | Klinar et al. |
| D669,523 S | 10/2012 | Wakata et al. |
| D671,590 S | 11/2012 | Klinar et al. |
| 8,311,623 B2 | 11/2012 | Sanger |
| 8,351,651 B2 | 1/2013 | Lee |
| 8,355,671 B2 | 1/2013 | Kramer et al. |
| 8,389,862 B2 | 3/2013 | Arora et al. |
| 8,421,634 B2 | 4/2013 | Tan et al. |
| 8,427,977 B2 | 4/2013 | Workman et al. |
| D682,343 S | 5/2013 | Waters |
| D682,727 S | 5/2013 | Bulgari |
| 8,435,191 B2 | 5/2013 | Barboutis et al. |
| 8,437,844 B2 | 5/2013 | Syed Momen et al. |
| 8,447,704 B2 | 5/2013 | Tan et al. |
| D685,019 S | 6/2013 | Li |
| 8,467,270 B2 | 6/2013 | Gossweiler, III et al. |
| 8,469,741 B2 | 6/2013 | Oster et al. |
| D687,087 S | 7/2013 | Iurilli |
| 8,484,022 B1 | 7/2013 | Vanhoucke |
| D689,862 S | 9/2013 | Liu |
| D692,941 S | 11/2013 | Klinar et al. |
| 8,591,411 B2 | 11/2013 | Banet et al. |
| D695,333 S | 12/2013 | Farnam et al. |
| D695,454 S | 12/2013 | Moore |
| 8,620,361 B2 | 12/2013 | Bailey et al. |
| 8,624,124 B2 | 1/2014 | Koo et al. |
| 8,634,119 B2 | 1/2014 | Bablumyan et al. |
| D701,555 S | 3/2014 | Markovitz et al. |
| 8,666,212 B1 | 3/2014 | Amirparviz |
| 8,702,629 B2 | 4/2014 | Giuffrida et al. |

(56) References Cited

U.S. PATENT DOCUMENTS

| | | |
|---|---|---|
| 8,704,882 B2 | 4/2014 | Turner |
| D704,248 S | 5/2014 | DiChiara |
| 8,718,980 B2 | 5/2014 | Garudadri et al. |
| 8,744,543 B2 | 6/2014 | Li et al. |
| 8,754,862 B2 | 6/2014 | Zaliva |
| 8,777,668 B2 | 7/2014 | Ikeda et al. |
| D716,457 S | 10/2014 | Brefka et al. |
| D717,685 S | 11/2014 | Bailey et al. |
| 8,879,276 B2 | 11/2014 | Wang |
| 8,880,163 B2 | 11/2014 | Barachant et al. |
| 8,883,287 B2 | 11/2014 | Boyce et al. |
| 8,890,875 B2 | 11/2014 | Jammes et al. |
| 8,892,479 B2 | 11/2014 | Tan et al. |
| 8,895,865 B2 | 11/2014 | Lenahan et al. |
| D719,568 S | 12/2014 | Heinrich et al. |
| D719,570 S | 12/2014 | Heinrich et al. |
| 8,912,094 B2 | 12/2014 | Koo et al. |
| 8,922,481 B1 | 12/2014 | Kauffmann et al. |
| D723,093 S | 2/2015 | Li |
| 8,954,135 B2 | 2/2015 | Yuen et al. |
| D724,647 S | 3/2015 | Rohrbach |
| 8,970,571 B1 | 3/2015 | Wong et al. |
| 8,971,023 B2 | 3/2015 | Olsson et al. |
| 9,018,532 B2 | 4/2015 | Wesselmann et al. |
| 9,037,530 B2 | 5/2015 | Tan et al. |
| 9,086,687 B2 | 7/2015 | Park et al. |
| 9,092,664 B2 | 7/2015 | Forutanpour et al. |
| D736,664 S | 8/2015 | Paradise et al. |
| D738,373 S | 9/2015 | Davies et al. |
| 9,135,708 B2 | 9/2015 | Ebisawa |
| 9,146,730 B2 | 9/2015 | Lazar |
| D741,855 S | 10/2015 | Park et al. |
| 9,170,674 B2 | 10/2015 | Forutanpour et al. |
| D742,272 S | 11/2015 | Bailey et al. |
| D742,874 S | 11/2015 | Cheng et al. |
| D743,963 S | 11/2015 | Osterhout |
| 9,211,417 B2 | 12/2015 | Heldman et al. |
| 9,218,574 B2 | 12/2015 | Phillipps et al. |
| D747,714 S | 1/2016 | Erbeus |
| D747,759 S | 1/2016 | Ho |
| 9,235,934 B2 | 1/2016 | Mandella et al. |
| 9,240,069 B1 | 1/2016 | Li |
| D750,623 S | 3/2016 | Park et al. |
| D751,065 S | 3/2016 | Magi |
| 9,278,453 B2 | 3/2016 | Assad |
| 9,299,248 B2 | 3/2016 | Lake et al. |
| D756,359 S | 5/2016 | Bailey et al. |
| 9,349,280 B2 | 5/2016 | Baldwin |
| D758,476 S | 6/2016 | Ho |
| D760,313 S | 6/2016 | Ho et al. |
| 9,367,139 B2 | 6/2016 | Ataee et al. |
| 9,372,535 B2 | 6/2016 | Bailey et al. |
| 9,389,694 B2 | 7/2016 | Ataee et al. |
| 9,393,418 B2 | 7/2016 | Giuffrida et al. |
| 9,408,316 B2 | 8/2016 | Bailey et al. |
| 9,418,927 B2 | 8/2016 | Axisa et al. |
| D766,895 S | 9/2016 | Choi |
| 9,439,566 B2 | 9/2016 | Arne et al. |
| D768,627 S | 10/2016 | Rochat et al. |
| 9,459,697 B2 | 10/2016 | Bedikian et al. |
| 9,472,956 B2 | 10/2016 | Michaelis et al. |
| 9,477,313 B2 | 10/2016 | Mistry et al. |
| D771,735 S | 11/2016 | Lee et al. |
| 9,483,123 B2 | 11/2016 | Aleem et al. |
| 9,529,434 B2 | 12/2016 | Choi et al. |
| D780,828 S | 3/2017 | Bonaventura et al. |
| D780,829 S | 3/2017 | Bonaventura et al. |
| 9,597,015 B2 | 3/2017 | McNames et al. |
| 9,600,030 B2 | 3/2017 | Bailey et al. |
| 9,612,661 B2 | 4/2017 | Wagner et al. |
| 9,613,262 B2 | 4/2017 | Holz |
| 9,654,477 B1 | 5/2017 | Kotamraju |
| 9,659,403 B1 | 5/2017 | Horowitz |
| 9,687,168 B2 | 6/2017 | John |
| 9,696,795 B2 | 7/2017 | Marcolina et al. |
| 9,720,515 B2 | 8/2017 | Wagner et al. |
| 9,741,169 B1 | 8/2017 | Holz |
| 9,766,709 B2 | 9/2017 | Holz |
| 9,785,247 B1 | 10/2017 | Horowitz et al. |
| 9,788,789 B2 | 10/2017 | Bailey |
| 9,807,221 B2 | 10/2017 | Bailey et al. |
| 9,864,431 B2 | 1/2018 | Keskin et al. |
| 9,867,548 B2 | 1/2018 | Le et al. |
| 9,880,632 B2 | 1/2018 | Ataee et al. |
| 9,891,718 B2 | 2/2018 | Connor |
| 10,042,422 B2 | 8/2018 | Morun et al. |
| 10,070,799 B2 | 9/2018 | Ang et al. |
| 10,078,435 B2 | 9/2018 | Noel |
| 10,101,809 B2 | 10/2018 | Morun et al. |
| 10,152,082 B2 | 12/2018 | Bailey |
| 10,188,309 B2 | 1/2019 | Morun et al. |
| 10,199,008 B2 | 2/2019 | Aleem et al. |
| 10,203,751 B2 | 2/2019 | Keskin et al. |
| 10,216,274 B2 | 2/2019 | Chapeskie et al. |
| 10,251,577 B2 | 4/2019 | Morun et al. |
| 10,310,601 B2 | 6/2019 | Morun et al. |
| 10,331,210 B2 | 6/2019 | Morun et al. |
| 10,362,958 B2 | 7/2019 | Morun et al. |
| 10,409,371 B2 | 9/2019 | Kaifosh et al. |
| 10,429,928 B2 | 10/2019 | Morun et al. |
| 10,460,455 B2 | 10/2019 | Giurgica-Tiron et al. |
| 2001/0033402 A1 | 10/2001 | Popovich |
| 2002/0003627 A1 | 1/2002 | Rieder |
| 2002/0009972 A1 | 1/2002 | Amento |
| 2002/0030636 A1 | 3/2002 | Richards |
| 2002/0032386 A1 | 3/2002 | Sackner et al. |
| 2002/0077534 A1 | 6/2002 | DuRousseau |
| 2002/0120415 A1 | 8/2002 | Millott |
| 2002/0120916 A1 | 8/2002 | Snider, Jr. |
| 2003/0030595 A1 | 2/2003 | Radley-Smith |
| 2003/0036691 A1 | 2/2003 | Stanaland et al. |
| 2003/0051505 A1 | 3/2003 | Robertson et al. |
| 2003/0144586 A1 | 7/2003 | Tsubata |
| 2003/0144829 A1 | 7/2003 | Geatz et al. |
| 2003/0171921 A1 | 9/2003 | Manabe et al. |
| 2003/0184544 A1 | 10/2003 | Prudent |
| 2004/0024312 A1 | 2/2004 | Zheng |
| 2004/0068409 A1 | 4/2004 | Tanaka et al. |
| 2004/0073104 A1 | 4/2004 | Brun del Re et al. |
| 2004/0092839 A1 | 5/2004 | Shin et al. |
| 2004/0194500 A1 | 10/2004 | Rapport |
| 2004/0210165 A1 | 10/2004 | Marmaropoulos et al. |
| 2005/0005637 A1 | 1/2005 | Rapport |
| 2005/0012715 A1 | 1/2005 | Ford |
| 2005/0070227 A1 | 3/2005 | Shen et al. |
| 2005/0119701 A1 | 6/2005 | Lauter et al. |
| 2005/0177038 A1 | 8/2005 | Kolpin et al. |
| 2005/0179644 A1 | 8/2005 | Alsio et al. |
| 2006/0037359 A1 | 2/2006 | Stinespring |
| 2006/0061544 A1 | 3/2006 | Min et al. |
| 2006/0121958 A1 | 6/2006 | Jung |
| 2006/0132705 A1 | 6/2006 | Li |
| 2006/0238707 A1 | 10/2006 | Elvesjo et al. |
| 2007/0009151 A1 | 1/2007 | Pittman et al. |
| 2007/0078308 A1 | 4/2007 | Daly |
| 2007/0132785 A1 | 6/2007 | Ebersole, Jr. et al. |
| 2007/0172797 A1 | 7/2007 | Hada et al. |
| 2007/0177770 A1 | 8/2007 | Derchak et al. |
| 2007/0256494 A1 | 11/2007 | Nakamura et al. |
| 2007/0276270 A1 | 11/2007 | Tran |
| 2007/0279852 A1 | 12/2007 | Daniel |
| 2007/0285399 A1 | 12/2007 | Lund |
| 2008/0001735 A1 | 1/2008 | Tran |
| 2008/0032638 A1 | 2/2008 | Anderson |
| 2008/0052643 A1 | 2/2008 | Ike et al. |
| 2008/0136775 A1 | 6/2008 | Conant |
| 2008/0214360 A1 | 9/2008 | Stirling et al. |
| 2008/0221487 A1 | 9/2008 | Zohar et al. |
| 2009/0007597 A1 | 1/2009 | Hanevold |
| 2009/0031757 A1 | 2/2009 | Harding |
| 2009/0040016 A1 | 2/2009 | Ikeda |
| 2009/0051544 A1 | 2/2009 | Niknejad |
| 2009/0082692 A1 | 3/2009 | Hale et al. |
| 2009/0082701 A1 | 3/2009 | Zohar et al. |

(56) References Cited

U.S. PATENT DOCUMENTS

| | | |
|---|---|---|
| 2009/0085864 A1* | 4/2009 | Kutliroff ............... A63F 13/10 345/156 |
| 2009/0102580 A1 | 4/2009 | Uchaykin |
| 2009/0109241 A1 | 4/2009 | Tsujimoto |
| 2009/0112080 A1 | 4/2009 | Matthews |
| 2009/0124881 A1 | 5/2009 | Rytky |
| 2009/0147004 A1 | 6/2009 | Ramon et al. |
| 2009/0179824 A1 | 7/2009 | Tsujimoto et al. |
| 2009/0189867 A1 | 7/2009 | Krah et al. |
| 2009/0207464 A1 | 8/2009 | Wiltshire et al. |
| 2009/0251407 A1 | 10/2009 | Flake et al. |
| 2009/0258669 A1 | 10/2009 | Nie et al. |
| 2009/0318785 A1 | 12/2009 | Ishikawa et al. |
| 2009/0322653 A1 | 12/2009 | Putilin et al. |
| 2009/0326406 A1 | 12/2009 | Tan et al. |
| 2009/0327171 A1* | 12/2009 | Tan ..................... G06F 3/015 706/12 |
| 2010/0030532 A1 | 2/2010 | Arora et al. |
| 2010/0041974 A1 | 2/2010 | Ting et al. |
| 2010/0063794 A1 | 3/2010 | Hernandez-Rebollar |
| 2010/0066664 A1 | 3/2010 | Son |
| 2010/0106044 A1 | 4/2010 | Linderman |
| 2010/0113910 A1 | 5/2010 | Brauers et al. |
| 2010/0142015 A1 | 6/2010 | Kuwahara et al. |
| 2010/0149073 A1 | 6/2010 | Chaum et al. |
| 2010/0150415 A1 | 6/2010 | Atkinson et al. |
| 2010/0280628 A1 | 11/2010 | Sankai |
| 2010/0292617 A1 | 11/2010 | Lei et al. |
| 2010/0293115 A1 | 11/2010 | Seyed Momen |
| 2010/0315266 A1 | 12/2010 | Gunawardana et al. |
| 2010/0317958 A1 | 12/2010 | Beck et al. |
| 2011/0018754 A1 | 1/2011 | Tojima et al. |
| 2011/0025982 A1 | 2/2011 | Takahashi |
| 2011/0054360 A1 | 3/2011 | Son et al. |
| 2011/0065319 A1 | 3/2011 | Oster et al. |
| 2011/0072510 A1 | 3/2011 | Cheswick |
| 2011/0077484 A1 | 3/2011 | Van Slyke et al. |
| 2011/0092826 A1 | 4/2011 | Lee et al. |
| 2011/0133934 A1 | 6/2011 | Tan |
| 2011/0134026 A1 | 6/2011 | Kang et al. |
| 2011/0166434 A1 | 7/2011 | Gargiulo |
| 2011/0172503 A1 | 7/2011 | Knepper et al. |
| 2011/0173204 A1 | 7/2011 | Murillo et al. |
| 2011/0181527 A1 | 7/2011 | Capela et al. |
| 2011/0213278 A1 | 9/2011 | Horak et al. |
| 2011/0224507 A1 | 9/2011 | Banet et al. |
| 2011/0224556 A1 | 9/2011 | Moon et al. |
| 2011/0224564 A1 | 9/2011 | Moon et al. |
| 2012/0002256 A1 | 1/2012 | Lacoste et al. |
| 2012/0029322 A1 | 2/2012 | Wartena et al. |
| 2012/0051005 A1 | 3/2012 | Vanfleteren et al. |
| 2012/0052268 A1 | 3/2012 | Axisa et al. |
| 2012/0053439 A1 | 3/2012 | Ylostalo et al. |
| 2012/0066163 A1 | 3/2012 | Balls et al. |
| 2012/0071092 A1 | 3/2012 | Pasquero et al. |
| 2012/0101357 A1 | 4/2012 | Hoskuldsson et al. |
| 2012/0139817 A1 | 6/2012 | Freeman |
| 2012/0157789 A1 | 6/2012 | Kangas et al. |
| 2012/0157886 A1 | 6/2012 | Tenn et al. |
| 2012/0165695 A1 | 6/2012 | Kidmose et al. |
| 2012/0182309 A1 | 7/2012 | Griffin et al. |
| 2012/0188158 A1 | 7/2012 | Tan et al. |
| 2012/0203076 A1 | 8/2012 | Fatta et al. |
| 2012/0209134 A1 | 8/2012 | Morita et al. |
| 2012/0226130 A1 | 9/2012 | De Graff et al. |
| 2012/0249797 A1 | 10/2012 | Haddick et al. |
| 2012/0265090 A1 | 10/2012 | Fink et al. |
| 2012/0265480 A1 | 10/2012 | Oshima |
| 2012/0275621 A1 | 11/2012 | Elko |
| 2012/0283526 A1 | 11/2012 | Gommesen et al. |
| 2012/0283896 A1 | 11/2012 | Persaud et al. |
| 2012/0293548 A1 | 11/2012 | Perez et al. |
| 2012/0302858 A1 | 11/2012 | Kidmose et al. |
| 2012/0320532 A1 | 12/2012 | Wang |
| 2012/0323521 A1* | 12/2012 | De Foras ............... G06F 3/017 702/141 |
| 2013/0004033 A1 | 1/2013 | Trugenberger |
| 2013/0005303 A1 | 1/2013 | Song et al. |
| 2013/0016292 A1 | 1/2013 | Miao et al. |
| 2013/0016413 A1 | 1/2013 | Saeedi et al. |
| 2013/0020948 A1 | 1/2013 | Han et al. |
| 2013/0027341 A1 | 1/2013 | Mastandrea |
| 2013/0077820 A1 | 3/2013 | Marais et al. |
| 2013/0080794 A1 | 3/2013 | Hsieh |
| 2013/0123666 A1 | 5/2013 | Giuffrida et al. |
| 2013/0127708 A1 | 5/2013 | Jung et al. |
| 2013/0135722 A1 | 5/2013 | Yokoyama |
| 2013/0141375 A1 | 6/2013 | Ludwig et al. |
| 2013/0165813 A1 | 6/2013 | Chang et al. |
| 2013/0191741 A1 | 7/2013 | Dickinson et al. |
| 2013/0198694 A1 | 8/2013 | Rahman et al. |
| 2013/0207889 A1 | 8/2013 | Chang et al. |
| 2013/0215235 A1 | 8/2013 | Russell |
| 2013/0217998 A1 | 8/2013 | Mahfouz et al. |
| 2013/0222384 A1 | 8/2013 | Futterer |
| 2013/0232095 A1 | 9/2013 | Tan et al. |
| 2013/0265229 A1 | 10/2013 | Forutanpour et al. |
| 2013/0265437 A1 | 10/2013 | Thörn et al. |
| 2013/0271292 A1 | 10/2013 | McDermott |
| 2013/0285901 A1 | 10/2013 | Lee et al. |
| 2013/0293580 A1 | 11/2013 | Spivack |
| 2013/0312256 A1 | 11/2013 | Wesselmann et al. |
| 2013/0317382 A1 | 11/2013 | Le |
| 2013/0317648 A1 | 11/2013 | Assad |
| 2013/0332196 A1 | 12/2013 | Pinsker |
| 2013/0335302 A1 | 12/2013 | Crane et al. |
| 2014/0005743 A1 | 1/2014 | Giuffrida et al. |
| 2014/0020945 A1 | 1/2014 | Hurwitz et al. |
| 2014/0028539 A1 | 1/2014 | Newham et al. |
| 2014/0028546 A1 | 1/2014 | Jeon et al. |
| 2014/0045547 A1 | 2/2014 | Singamsetty et al. |
| 2014/0049417 A1 | 2/2014 | Abdurrahman et al. |
| 2014/0051946 A1 | 2/2014 | Arne et al. |
| 2014/0052150 A1 | 2/2014 | Taylor et al. |
| 2014/0074179 A1 | 3/2014 | Heldman et al. |
| 2014/0092009 A1 | 4/2014 | Yen et al. |
| 2014/0094675 A1 | 4/2014 | Luna et al. |
| 2014/0098018 A1 | 4/2014 | Kim et al. |
| 2014/0107493 A1 | 4/2014 | Yuen et al. |
| 2014/0121471 A1 | 5/2014 | Walker |
| 2014/0122958 A1 | 5/2014 | Greenebrg et al. |
| 2014/0132512 A1 | 5/2014 | Gomez Sainz-Garcia |
| 2014/0139422 A1 | 5/2014 | Mistry et al. |
| 2014/0157168 A1 | 6/2014 | Albouyeh et al. |
| 2014/0194062 A1 | 7/2014 | Palin et al. |
| 2014/0196131 A1 | 7/2014 | Lee |
| 2014/0198034 A1 | 7/2014 | Bailey et al. |
| 2014/0198035 A1 | 7/2014 | Bailey et al. |
| 2014/0198944 A1 | 7/2014 | Forutanpour et al. |
| 2014/0202643 A1 | 7/2014 | Hikmet et al. |
| 2014/0204455 A1 | 7/2014 | Popovich et al. |
| 2014/0223462 A1 | 8/2014 | Aimone et al. |
| 2014/0226193 A1 | 8/2014 | Sun |
| 2014/0232651 A1 | 8/2014 | Kress et al. |
| 2014/0236031 A1 | 8/2014 | Banet et al. |
| 2014/0240103 A1 | 8/2014 | Lake et al. |
| 2014/0240223 A1 | 8/2014 | Lake et al. |
| 2014/0245200 A1 | 8/2014 | Holz |
| 2014/0249397 A1 | 9/2014 | Lake et al. |
| 2014/0257141 A1 | 9/2014 | Giuffrida et al. |
| 2014/0258864 A1 | 9/2014 | Shenoy et al. |
| 2014/0278441 A1 | 9/2014 | Ton et al. |
| 2014/0285326 A1 | 9/2014 | Luna et al. |
| 2014/0285429 A1 | 9/2014 | Simmons |
| 2014/0297528 A1 | 10/2014 | Agrawal et al. |
| 2014/0299362 A1 | 10/2014 | Park et al. |
| 2014/0304665 A1 | 10/2014 | Holz |
| 2014/0334083 A1 | 11/2014 | Bailey |
| 2014/0334653 A1 | 11/2014 | Luna et al. |
| 2014/0337861 A1 | 11/2014 | Chang et al. |
| 2014/0340857 A1 | 11/2014 | Hsu et al. |
| 2014/0344731 A1 | 11/2014 | Holz |
| 2014/0349257 A1 | 11/2014 | Connor |

(56) References Cited

U.S. PATENT DOCUMENTS

| | | |
|---|---|---|
| 2014/0354528 A1 | 12/2014 | Laughlin et al. |
| 2014/0354529 A1 | 12/2014 | Laughlin et al. |
| 2014/0355825 A1 | 12/2014 | Kim et al. |
| 2014/0364703 A1 | 12/2014 | Kim et al. |
| 2014/0365163 A1 | 12/2014 | Jallon |
| 2014/0368424 A1 | 12/2014 | Choi et al. |
| 2014/0368896 A1 | 12/2014 | Nakazono et al. |
| 2014/0375465 A1 | 12/2014 | Fenuccio et al. |
| 2014/0376773 A1 | 12/2014 | Holz |
| 2015/0006120 A1 | 1/2015 | Sett et al. |
| 2015/0010203 A1 | 1/2015 | Muninder et al. |
| 2015/0011857 A1 | 1/2015 | Henson et al. |
| 2015/0025355 A1 | 1/2015 | Bailey et al. |
| 2015/0029092 A1 | 1/2015 | Holz et al. |
| 2015/0035827 A1 | 2/2015 | Yamaoka et al. |
| 2015/0036221 A1 | 2/2015 | Stephenson |
| 2015/0045689 A1 | 2/2015 | Barone |
| 2015/0045699 A1 | 2/2015 | Mokaya et al. |
| 2015/0051470 A1 | 2/2015 | Bailey et al. |
| 2015/0057506 A1 | 2/2015 | Luna et al. |
| 2015/0057770 A1 | 2/2015 | Bailey et al. |
| 2015/0065840 A1 | 3/2015 | Bailey |
| 2015/0070270 A1 | 3/2015 | Bailey et al. |
| 2015/0070274 A1 | 3/2015 | Morozov |
| 2015/0084860 A1 | 3/2015 | Aleem et al. |
| 2015/0106052 A1* | 4/2015 | Balakrishnan ....... A61B 5/1123 702/150 |
| 2015/0109202 A1 | 4/2015 | Ataee et al. |
| 2015/0124566 A1 | 5/2015 | Lake et al. |
| 2015/0128094 A1 | 5/2015 | Baldwin et al. |
| 2015/0141784 A1 | 5/2015 | Morun et al. |
| 2015/0148641 A1 | 5/2015 | Morun et al. |
| 2015/0157944 A1 | 6/2015 | Gottlieb |
| 2015/0160621 A1 | 6/2015 | Yilmaz |
| 2015/0169074 A1 | 6/2015 | Ataee |
| 2015/0182113 A1 | 7/2015 | Utter, II |
| 2015/0182130 A1 | 7/2015 | Utter, II |
| 2015/0182163 A1 | 7/2015 | Utter |
| 2015/0182164 A1 | 7/2015 | Utter, II |
| 2015/0185838 A1 | 7/2015 | Camacho-Perez et al. |
| 2015/0186609 A1 | 7/2015 | Utter, II |
| 2015/0193949 A1 | 7/2015 | Katz et al. |
| 2015/0205126 A1 | 7/2015 | Schowengerdt |
| 2015/0205134 A1 | 7/2015 | Bailey et al. |
| 2015/0216475 A1 | 8/2015 | Luna et al. |
| 2015/0223716 A1 | 8/2015 | Korkala et al. |
| 2015/0230756 A1 | 8/2015 | Luna et al. |
| 2015/0234426 A1 | 8/2015 | Bailey et al. |
| 2015/0237716 A1 | 8/2015 | Su et al. |
| 2015/0242120 A1 | 8/2015 | Rodriguez |
| 2015/0261306 A1 | 9/2015 | Lake |
| 2015/0261318 A1 | 9/2015 | Scavezze et al. |
| 2015/0277575 A1 | 10/2015 | Ataee et al. |
| 2015/0296553 A1 | 10/2015 | DiFranco et al. |
| 2015/0302168 A1 | 10/2015 | De Sapio et al. |
| 2015/0309563 A1 | 10/2015 | Connor |
| 2015/0309582 A1 | 10/2015 | Gupta |
| 2015/0310766 A1 | 10/2015 | Alshehri et al. |
| 2015/0313496 A1 | 11/2015 | Connor |
| 2015/0325202 A1 | 11/2015 | Lake et al. |
| 2015/0346701 A1 | 12/2015 | Gordon et al. |
| 2015/0362734 A1 | 12/2015 | Moser et al. |
| 2015/0366504 A1 | 12/2015 | Connor |
| 2015/0370326 A1 | 12/2015 | Chapeskie et al. |
| 2015/0370333 A1 | 12/2015 | Ataee et al. |
| 2015/0378161 A1 | 12/2015 | Bailey et al. |
| 2015/0378162 A1 | 12/2015 | Bailey et al. |
| 2015/0378164 A1 | 12/2015 | Bailey et al. |
| 2016/0011668 A1 | 1/2016 | Gilad-Bachrach et al. |
| 2016/0020500 A1 | 1/2016 | Matsuda |
| 2016/0033771 A1 | 2/2016 | Tremblay et al. |
| 2016/0049073 A1 | 2/2016 | Lee |
| 2016/0144172 A1 | 5/2016 | Hsueh et al. |
| 2016/0150636 A1 | 5/2016 | Otsubo |
| 2016/0156762 A1 | 6/2016 | Bailey et al. |
| 2016/0162604 A1 | 6/2016 | Xioli et al. |
| 2016/0187992 A1 | 6/2016 | Yamamoto et al. |
| 2016/0199699 A1 | 7/2016 | Klassen |
| 2016/0202081 A1 | 7/2016 | Debieuvre et al. |
| 2016/0235323 A1 | 8/2016 | Tadi et al. |
| 2016/0238845 A1 | 8/2016 | Alexander et al. |
| 2016/0239080 A1 | 8/2016 | Marcolina et al. |
| 2016/0246384 A1 | 8/2016 | Mullins et al. |
| 2016/0262687 A1 | 9/2016 | Imperial |
| 2016/0274365 A1 | 9/2016 | Bailey et al. |
| 2016/0274758 A1 | 9/2016 | Bailey |
| 2016/0292497 A1 | 10/2016 | Kehtarnavaz et al. |
| 2016/0309249 A1 | 10/2016 | Wu et al. |
| 2016/0313798 A1 | 10/2016 | Connor |
| 2016/0313801 A1 | 10/2016 | Wagner et al. |
| 2016/0313899 A1 | 10/2016 | Noel |
| 2016/0327796 A1 | 11/2016 | Bailey et al. |
| 2016/0327797 A1 | 11/2016 | Bailey et al. |
| 2016/0349514 A1 | 12/2016 | Alexander et al. |
| 2016/0349515 A1 | 12/2016 | Alexander et al. |
| 2016/0349516 A1 | 12/2016 | Alexander et al. |
| 2016/0350973 A1 | 12/2016 | Shapira et al. |
| 2016/0377865 A1 | 12/2016 | Alexander et al. |
| 2016/0377866 A1 | 12/2016 | Alexander et al. |
| 2017/0031502 A1 | 2/2017 | Rosenberg et al. |
| 2017/0035313 A1 | 2/2017 | Hong et al. |
| 2017/0061817 A1 | 3/2017 | Mettler May |
| 2017/0068095 A1 | 3/2017 | Holland et al. |
| 2017/0080346 A1 | 3/2017 | Abbas |
| 2017/0090604 A1 | 3/2017 | Barbier |
| 2017/0091567 A1 | 3/2017 | Wang et al. |
| 2017/0097753 A1 | 4/2017 | Bailey et al. |
| 2017/0115483 A1 | 4/2017 | Aleem et al. |
| 2017/0119472 A1 | 5/2017 | Herrmann et al. |
| 2017/0123487 A1 | 5/2017 | Hazra et al. |
| 2017/0124816 A1 | 5/2017 | Yang et al. |
| 2017/0127354 A1 | 5/2017 | Garland et al. |
| 2017/0153701 A1 | 6/2017 | Mahon et al. |
| 2017/0161635 A1 | 6/2017 | Oono et al. |
| 2017/0188980 A1 | 7/2017 | Ash |
| 2017/0205876 A1 | 7/2017 | Vidal et al. |
| 2017/0212290 A1 | 7/2017 | Alexander et al. |
| 2017/0212349 A1 | 7/2017 | Bailey et al. |
| 2017/0219829 A1 | 8/2017 | Bailey |
| 2017/0259167 A1 | 9/2017 | Cook et al. |
| 2017/0285756 A1 | 10/2017 | Wang et al. |
| 2017/0285848 A1 | 10/2017 | Rosenberg et al. |
| 2017/0296363 A1 | 10/2017 | Yetkin et al. |
| 2017/0299956 A1 | 10/2017 | Holland et al. |
| 2017/0301630 A1 | 10/2017 | Nguyen et al. |
| 2017/0308118 A1 | 10/2017 | Ito |
| 2018/0000367 A1 | 1/2018 | Longinotti-Buitoni |
| 2018/0020951 A1 | 1/2018 | Kaifosh et al. |
| 2018/0020978 A1 | 1/2018 | Kaifosh et al. |
| 2018/0024634 A1 | 1/2018 | Kaifosh et al. |
| 2018/0024635 A1 | 1/2018 | Kaifosh et al. |
| 2018/0064363 A1 | 3/2018 | Morun et al. |
| 2018/0067553 A1 | 3/2018 | Morun et al. |
| 2018/0088765 A1 | 3/2018 | Bailey |
| 2018/0095630 A1 | 4/2018 | Bailey |
| 2018/0101289 A1 | 4/2018 | Bailey |
| 2018/0120948 A1 | 5/2018 | Aleem et al. |
| 2018/0140441 A1 | 5/2018 | Poirters |
| 2018/0150033 A1 | 5/2018 | Lake et al. |
| 2018/0153430 A1 | 6/2018 | Ang et al. |
| 2018/0153444 A1 | 6/2018 | Yang et al. |
| 2018/0154140 A1 | 6/2018 | Bouton et al. |
| 2018/0301057 A1 | 10/2018 | Hargrove et al. |
| 2018/0307314 A1 | 10/2018 | Connor |
| 2018/0321745 A1 | 11/2018 | Morun et al. |
| 2018/0321746 A1 | 11/2018 | Morun et al. |
| 2018/0333575 A1 | 11/2018 | Bouton |
| 2018/0344195 A1 | 12/2018 | Morun et al. |
| 2018/0360379 A1 | 12/2018 | Harrison et al. |
| 2019/0025919 A1 | 1/2019 | Tadi et al. |
| 2019/0033967 A1 | 1/2019 | Morun et al. |
| 2019/0038166 A1 | 2/2019 | Tavabi et al. |
| 2019/0076716 A1 | 3/2019 | Chiou et al. |
| 2019/0121305 A1 | 4/2019 | Kaifosh et al. |

(56) References Cited

U.S. PATENT DOCUMENTS

| | | |
|---|---|---|
| 2019/0121306 A1 | 4/2019 | Kaifosh et al. |
| 2019/0150777 A1 | 5/2019 | Guo et al. |
| 2019/0192037 A1 | 6/2019 | Morun et al. |
| 2019/0212817 A1 | 7/2019 | Kaifosh et al. |
| 2019/0223748 A1 | 7/2019 | Al-natsheh et al. |
| 2019/0227627 A1 | 7/2019 | Kaifosh et al. |
| 2019/0228330 A1 | 7/2019 | Kaifosh et al. |
| 2019/0228533 A1 | 7/2019 | Giurgica-Tiron et al. |
| 2019/0228579 A1 | 7/2019 | Kaifosh et al. |
| 2019/0228590 A1 | 7/2019 | Kaifosh et al. |
| 2019/0228591 A1 | 7/2019 | Giurgica-Tiron et al. |

FOREIGN PATENT DOCUMENTS

| | | |
|---|---|---|
| CA | 2939644 A1 | 8/2015 |
| CN | 1838933 A | 9/2006 |
| CN | 102246125 A | 11/2011 |
| CN | 105190578 A | 12/2015 |
| CN | 106102504 A | 11/2016 |
| DE | 44 12 278 A1 | 10/1995 |
| EP | 0 301 790 A2 | 2/1989 |
| EP | 2009-50679 A | 3/2009 |
| EP | 2198521 B1 | 6/2012 |
| EP | 2733578 A2 | 5/2014 |
| EP | 2959394 A1 | 12/2015 |
| EP | 3104737 A1 | 12/2016 |
| JP | 61-198892 A | 9/1986 |
| JP | H05-277080 A | 10/1993 |
| JP | 7248873 | 9/1995 |
| JP | 2005-095561 A | 4/2005 |
| JP | 2005-352739 A | 12/2005 |
| JP | 2008-192004 A | 8/2008 |
| JP | 2010-520561 A | 6/2010 |
| JP | 2013-160905 A | 8/2013 |
| JP | 2016-507851 A | 3/2016 |
| JP | 2017-509386 A | 4/2017 |
| KR | 10-2012-0094870 A | 8/2012 |
| KR | 2012-0094870 A | 8/2012 |
| KR | 10-2012-0097997 A | 9/2012 |
| KR | 2012-0097997 A | 9/2012 |
| KR | 2015-0123254 A | 11/2015 |
| KR | 2016-0121552 A | 10/2016 |
| KR | 10-1790147 B1 | 10/2017 |
| WO | WO 2008/109248 A2 | 9/2008 |
| WO | WO 2009/042313 A1 | 4/2009 |
| WO | WO 2010/104879 A2 | 9/2010 |
| WO | WO 2011/011750 A1 | 1/2011 |
| WO | 2011/070554 A2 | 6/2011 |
| WO | WO 2014/130871 A1 | 8/2014 |
| WO | WO 2014/186370 A1 | 11/2014 |
| WO | WO 2014/194257 A1 | 12/2014 |
| WO | WO 2014/197443 A1 | 12/2014 |
| WO | WO 2015/027089 A1 | 2/2015 |
| WO | WO 2015/073713 A1 | 5/2015 |
| WO | WO 2015/081113 A1 | 6/2015 |
| WO | WO 2015/123445 A1 | 8/2015 |
| WO | WO 2015/123775 A1 | 8/2015 |
| WO | WO 2015/199747 A1 | 12/2015 |
| WO | WO 2016/041088 A1 | 3/2016 |
| WO | WO 2017/062544 A1 | 4/2017 |
| WO | WO 2017/092225 A1 | 6/2017 |
| WO | WO 2017/120669 A1 | 7/2017 |
| WO | WO 2017/172185 A1 | 10/2017 |

OTHER PUBLICATIONS

Communication pursuant to Rule 164(1) EPC, dated Sep. 30, 2016, for corresponding EP Application No. 14753949.8, 7 pages.

Costanza et al., "EMG as a Subtle Input Interface for Mobile Computing," *Mobile HCI 2004*, LNCS 3160, edited by S. Brewster and M. Dunlop, Springer-Verlag Berlin Heidelberg, pp. 426-430, 2004.

Costanza et al., "Toward Subtle Intimate Interfaces for Mobile Devices Using an EMG Controller," CHI 2005, *Proceedings of the SIGCHI Conference on Human Factors in Computing Systems*, pp. 481-489, 2005.

Ghasemzadeh et al., "A Body Sensor Network With Electromyogram and Inertial Sensors: Multimodal Interpretation of Muscular Activities," *IEEE Transactions on Information Technology in Biomedicine*, vol. 14, No. 2, pp. 198-206, Mar. 2010.

Gourmelon et al., "Contactless sensors for Surface Electromyography," *Proceedings of the 28th IEEE EMBS Annual International Conference*, New York City, NY, Aug. 30-Sep. 3, 2006, pp. 2514-2517.

International Search Report and Written Opinion, dated Aug. 21, 2014, for International Application No. PCT/US2014/037863, 12 pages.

International Search Report and Written Opinion, dated Feb. 27, 2015, for International Application No. PCT/US2014/067443, 13 pages.

International Search Report and Written Opinion, dated May 16, 2014, for International Application No. PCT/US2014/017799, 11 pages.

International Search Report and Written Opinion, dated May 27, 2015, for International Application No. PCT/US2015/015675, 9 pages.

International Search Report and Written Opinion, dated Nov. 21, 2014, for International Application No. PCT/US2014/052143, 11 pages.

Janssen, "Radio Frequency (RF)" 2013, retrieved from https://web.archive.org/web/20130726153946/https://www.techopedia.com/definition/5083/radio-frequency-rf, retrieved on Jul. 12, 2017, 2 pages.

Merriam-Webster, "Radio Frequencies" retrieved from https://www.merriam-webster.com/table/collegiate/radiofre.htm, retrieved on Jul. 12, 2017, 2 pages.

Morris et al., "Emerging Input Technologies for Always-Available Mobile Interaction," *Foundations and Trends in Human-Computer Interaction* 4(4):245-316, 2011. (74 total pages).

Naik et al., "Real-Time Hand Gesture Identification for Human Computer Interaction Based on ICA of Surface Electromyogram," *IADIS International Conference Interfaces and Human Computer Interaction 2007*, 8 pages.

Picard et al., "Affective Wearables," *Proceedings of the IEEE 1st International Symposium on Wearable Computers*, ISWC, Cambridge, MA, USA, Oct. 13-14, 1997, pp. 90-97.

Rekimoto, "GestureWrist and GesturePad: Unobtrusive Wearable Interaction Devices," ISWC '01 *Proceedings of the 5th IEEE International Symposium on Wearable Computers*, 2001, 7 pages.

Saponas et al., "Making Muscle-Computer Interfaces More Practical," *CHI 2010*, Atlanta, Georgia, USA, Apr. 10-15, 2010, 4 pages.

Sato et al., "Touché: Enhancing Touch Interaction on Humans, Screens, Liquids, and Everyday Objects," *CHI' 12*, May 5-10, 2012, Austin, Texas.

Ueno et al., "A Capacitive Sensor System for Measuring Laplacian Electromyogram through Cloth: A Pilot Study," *Proceedings of the 29th Annual International Conference of the IEEE EMBS*, Cité Internationale, Lyon, France, Aug. 23-26, 2007, pp. 5731-5734.

Ueno et al., "Feasibility of Capacitive Sensing of Surface Electromyographic Potential through Cloth," *Sensors and Materials* 24(6):335-346, 2012.

Xiong et al., "A Novel HCI based on EMG and IMU," *Proceedings of the 2011 IEEE International Conference on Robotics and Biomimetics*, Phuket, Thailand, Dec. 7-11, 2011, 5 pages.

Xu et al., "Hand Gesture Recognition and Virtual Game Control Based on 3D Accelerometer and EMG Sensors," *Proceedings of the 14th international conference on Intelligent user interfaces*, Sanibel Island, Florida, Feb. 8-11, 2009, pp. 401-406.

Zhang et al., "A Framework for Hand Gesture Recognition Based on Accelerometer and EMG Sensors," *IEEE Transactions on Systems, Man, and Cybernetics—Part A: Systems and Humans*, vol. 41, No. 6, pp. 1064-1076, Nov. 2011.

International Search Report and Written Opinion for International Application No. PCT/US2014/057029 dated Feb. 24, 2015.

International Search Report and Written Opinion for International Application No. PCT/US2016/018293 dated Jun. 8, 2016.

(56) References Cited

OTHER PUBLICATIONS

International Search Report and Written Opinion for International Application No. PCT/US2016/018298 dated Jun. 8, 2016.
International Search Report and Written Opinion for International Application No. PCT/US2016/018299 dated Jun. 8, 2016.
International Search Report and Written Opinion for International Application No. PCT/US2016/067246 dated Apr. 25, 2017.
International Preliminary Report on Patentability for International Application No. PCT/US2017/043686 dated Feb. 7, 2019.
International Search Report and Written Opinion for International Application No. PCT/US2017/043686 dated Oct. 6, 2017.
International Preliminary Report on Patentability for International Application No. PCT/US2017/043693 dated Feb. 7, 2019.
International Search Report and Written Opinion for International Application No. PCT/US2017/043693 dated Oct. 6, 2017.
International Preliminary Report on Patentability for International Application No. PCT/US2017/043791 dated Feb. 7, 2019.
International Search Report and Written Opinion for International Application No. PCT/US2017/043791 dated Oct. 5, 2017.
International Preliminary Report on Patentability for International Application No. PCT/US2017/043792 dated Feb. 7, 2019.
International Search Report and Written Opinion for International Application No. PCT/US2017/043792 dated Oct. 5, 2017.
International Search Report and Written Opinion for International Application No. PCT/US2018/056768 dated Jan. 15, 2019.
International Search Report and Written Opinion for International Application No. PCT/US2018/061409 dated Mar. 12, 2019.
International Search Report and Written Opinion for International Application No. PCT/US2018/063215 dated Mar. 21, 2019.
International Search Report and Written Opinion for International Application No. PCT/US2019/015134 dated May 15, 2019.
International Search Report and Written Opinion for International Application No. PCT/US2019/015167 dated May 21, 2019.
International Search Report and Written Opinion for International Application No. PCT/US2019/015174 dated May 21, 2019.
International Search Report and Written Opinion for International Application No. PCT/US2019/015238 dated May 16, 2019.
International Search Report and Written Opinion for International Application No. PCT/US2019/015183 dated May 3, 2019.
International Search Report and Written Opinion for International Application No. PCT/US2019/015180 dated May 28, 2019.
International Search Report and Written Opinion for International Application No. PCT/US2019/015244 dated May 16, 2019.
International Search Report and Written Opinion for International Application No. PCT/US2019/037302 dated Oct. 11, 2019.
International Search Report and Written Opinion for International Application No. PCT/US2019/028299 dated Aug. 9, 2019.
International Search Report and Written Opinion for International Application No. PCT/US2019/034173 dated Sep. 18, 2019.
Invitation to Pay Additional Fees for International Application No. PCT/US2019/031114 dated Aug. 6, 2019.
Invitation to Pay Additional Fees for International Application No. PCT/US2019/049094 dated Oct. 24, 2019.
International Search Report and Written Opinion for International Application No. PCT/US19/20065 dated May 16, 2019.
[No Author Listed], IEEE 100 The Authoritative Dictionary of IEEE Standards Terms, Dec. 2000, The Institute of Electrical and Electronics Engineering, Inc. 3 Park Avenue, New York, NY, 10016-5997, USA, p. 1004. 3 pages.
Amitai, P-27: A Two-Dimensional Aperture Expander for Ultra-Compact, High-Performance Head-Worn Displays. SID Symposium Digest of Technical Papers. 2005;36(1):360-363.
Arkenbout et al., Robust Hand Motion Tracking through Data Fusion of 5DT Data Glove and Nimble VR Kinect Camera Measurements. Sensors. 2015;15:31644-71.
Ayras et al., Exit pupil expander with a large field of view based on diffractive optics. Journal of the SID. 2009;17(8):659-664.
Benko et al., Enhancing Input On and Above the Interactive Surface with Muscle Sensing. The ACM International Conference on Interactive Tabletops and Surfaces. ITS '09. 2009:93-100.
Boyali et al., Spectral Collaborative Representation based Classification for hand gestures recognition on electromyography signals. Biomedical Signal Processing and Control. 2016;24:11-18.
Brownlee, Finite State Machines as a Control Technique in Artificial Intelligence. Jun. 2002. 12 pages.
Chellappan et al., Laser-based displays: a review. Applied Optics. 2010;49(25):F79-F98.
Cheng et al., A Novel Phonology- and Radical-Coded Chinese Sign Language Recognition Framework Using Accelerometer and Surface Electromyography Sensors. Sensors. 2015;15:23303-24.
Csapo et al., Evaluation of Human-Myo Gesture Control Capabilities in Continuous Search and Select Operations. 7th IEEE International Conference on Cognitive Infocommunications. 2016;000415-20.
Cui et al., Diffraction from angular multiplexing slanted volume hologram gratings. Optik 2005;116:118-122.
Curatu et al., Dual Purpose Lens for an Eye-Tracked Projection Head-Mounted Display. International Optical Design Conference 2006, SPIE-OSA 2006;6342:63420X-1-63420X-7. 7 pages.
Curatu et al., Projection-based head-mounted display with eye-tracking capabilities. Proceedings of SPIE. 2005;5875:58750J-1-58750J-9. 9 pages.
Davoodi et al., Development of a Physics-Based Target Shooting Game to Train Amputee Users of Multijoint Upper Limb Prostheses. Presence. Massachusetts Institute of Technology. 2012;21(1):85-95.
Delis et al., Development of a Myoelectric Controller Based on Knee Angle Estimation. Biodevices 2009. International Conference on Biomedical Electronics and Devices. Jan. 17, 2009. 7 pages.
Diener et al., Direct conversion from facial myoelectric signals to speech using Deep Neural Networks. 2015 International Joint Conference on Neural Networks (IJCNN). Oct. 1, 2015. 7 pages.
Ding et al., HMM with improved feature extraction-based feature parameters for identity recognition of gesture command operators by using a sensed Kinect-data stream. Neurocomputing. 2017;262:108-19.
Essex, Tutorial on Optomechanical Beam Steering Mechanisms. OPTI 521 Tutorial, College of Optical Sciences, University of Arizona, 8 pages, 2006.
Farina et al., Man/machine interface based on the discharge timings of spinal motor neurons after targeted muscle reinnervation. Nature. Biomedical Engineering. 2017;1:1-12.
Favorskaya et al., Localization and Recognition of Dynamic Hand Gestures Based on Hierarchy of Manifold Classifiers. International Archives of the Photogrammetry, Remote Sensing and Spatial Information Sciences. 2015;XL-5/W6:1-8.
Fernandez et al., Optimization of a thick polyvinyl alcohol-acrylamide photopolymer for data storage using a combination of angular and peristrophic holographic multiplexing. Applied Optics 2009;45(29):7661-7666.
Gallina et al., Surface EMG Biofeedback. Surface Electromyography: Physiology, Engineering, and Applications. 2016:485-500.
Gopura et al., A Human Forearm and wrist motion assist exoskeleton robot with EMG-based fuzzy-neuro control. Proceedings of the 2nd IEEE/RAS-EMBS International Conference on Biomedical Robotics and Biomechatronics. Oct. 19-22, 2008. 6 pages.
Hainich et al., Chapter 10: Near-Eye Displays. Displays: Fundamentals & Applications, AK Peters/CRC Press. 2011. 65 pages.
Hauschild et al., A Virtual Reality Environment for Designing and Fitting Neural Prosthetic Limbs. IEEE Transactions on Neural Systems and Rehabilitation Engineering. 2007;15(1):9-15.
Hornstein et al., Maradin's Micro-Mirror—System Level Synchronization Notes. SID 2012 Digest, pp. 981-984.
Itoh et al., Interaction-Free Calibration for Optical See-Through Head-Mounted Displays based on 3D Eye Localization. 2014 IEEE Symposium on 3D User Interfaces (3DUI), pp. 75-82, 2014.
Janssen, What is Radio Frequency (RF)? Technopedia, 2013. 2 pages. URL:https://web.archive.org/web/20130726153946/https://www.technopedia.com/definition/5083/radio-frequency-rf [last accessed on Jul. 12, 2017].
Jiang, Purdue University Graduate School Thesis/Dissertation Acceptance. Graduate School Form 30. Updated Jan. 15, 2015. 24 pages.

(56) References Cited

OTHER PUBLICATIONS

Kawaguchi et al., Estimation of Finger Joint Angles Based on Electromechanical Sensing of Wrist Shape. IEEE Transactions on Neural Systems and Rehabilitation Engineering. 2017;25(9):1409-18.
Kessler, Optics of Near to Eye Displays (NEDs). Presentation—Oasis 2013, Tel Aviv, Feb. 19, 2013, 37 pages.
Kim et al., Real-Time Human Pose Estimation and Gesture Recognition from Depth Images Using Superpixels and SVM Classifier. Sensors. 2015;15:12410-27.
Koerner, Design and Characterization of the Exo-Skin Haptic Device: A Novel Tendon Actuated Textile Hand Exoskeleton. 2017. 5 pages.
Kress et al., A review of head-mounted displays (HMD) technologies and applications for consumer electronics. Proc. of SPIE. 2013;8720:87200A-1-87200A-13. 13 pages.
Kress et al., Diffractive and Holographic Optics as Optical Combiners in Head Mounted Displays. Proceedings of the 2013 ACM Conference on Pervasive and Ubiquitous Computing Adjunct Publication, pp. 1479-1482, 2013.
Kress, Optical architectures for see-through wearable displays. Presentation—Bay Area—SID Seminar, Apr. 30, 2014, 156 pages.
Lee et al., Motion and Force Estimation System of Human Fingers. Journal of Institute of Control, Robotics and Systems. 2011;17(10):1014-1020.
Levola, 7.1: Invited Paper: Novel Diffractive Optical Components for Near to Eye Displays. SID Symposium Digest of Technical Papers 2006;37(1):64-67.
Li et al., Motor Function Evaluation of Hemiplegic Upper-Extremities Using Data Fusion from Wearable Inertial and Surface EMG Sensors. Sensors. MDPI. 2017;17(582):1-17.
Liao et al., The Evolution of MEMS Displays. IEEE Transactions on Industrial Electronics 2009;56(4):1057-1065.
Lippert, Chapter 6: Display Devices: RSD™ (Retinal Scanning Display). The Avionics Handbook, CRC Press, 2001, 8 pages.
Lopes et al., Hand/arm gesture segmentation by motion using IMU and EMG sensing. ScienceDirect. Elsevier. Procedia Manufacturing. 2017;11:107-13.
Majaranta et al., Chapter 3 Eye-Tracking and Eye-Based Human-Computer Interaction. Advances in Physiological Computing, Springer-Verlag London, 2014, pp. 39-65.
Martin et al., A Novel Approach of Prosthetic Arm Control using Computer Vision, Biosignals, and Motion Capture. IEEE. 2014. 5 pages.
Mcintee, A Task Model of Free-Space Movement-Based Gestures. Dissertation. Graduate Faculty of North Carolina State University. Computer Science. 2016. 129 pages.
Mendes et al., Sensor Fusion and Smart Sensor in Sports and Biomedical Applications. Sensors. 2016;16(1569):1-31.
Mohamed, Homogeneous cognitive based biometrics for static authentication. Dissertation submitted to University of Victoria, Canada. 2010. 149 pages. URL:http://hdl.handle.net/1828/3211 [last accessed Oct. 11, 2019].
Naik et al., Source Separation and Identification issues in bio signals: A solution using Blind source separation. Intech. 2009. 23 pages.
Naik et al., Subtle Hand gesture identification for HCI using Temporal Decorrelation Source Separation BSS of surface EMG. Digital Image Computing Techniques and Applications. IEEE Computer Society. 2007;30-7.
Negro et al., Multi-channel intramuscular and surface EMG decomposition by convolutive blind source separation. Journal of Neural Engineering. 2016;13:1-17.
Saponas et al., Demonstrating the Feasibility of Using Forearm Electromyography for Muscle-Computer Interfaces. CHI 2008 Proceedings. Physiological Sensing for Input. 2008:515-24.
Saponas et al., Enabling Always-Available Input with Muscle-Computer Interfaces. UIST '09. 2009:167-76.
Saponas et al., Making Muscle-Computer Interfaces More Practical. CHI 2010: Brauns and Brawn. 2010:851-4.
Sartori et al., Neural Data-Driven Musculoskeletal Modeling for Personalized Neurorehabilitation Technologies. IEEE Transactions on Biomedical Engineering. 2016;63(5):879-93.
Sauras-Perez et al., A Voice and Pointing Gesture Interaction System for Supporting Human Spontaneous Decisions in Autonomous Cars. Clemson University. All Dissertations. 2017. 174 pages.
Schowengerdt et al., Stereoscopic retinal scanning laser display with integrated focus cues for ocular accommodation. Proc. of SPIE-IS&T Electronic Imaging 2004;5291:366-376.
Shen et al., I am a Smartwatch and I can Track my User's Arm. University of Illinois at Urbana-Champaign. MobiSys' 16. 12 pages.
Silverman et al., 58.5L: Late-News Paper: Engineering a Retinal Scanning Laser Display with Integrated Accommodative Depth Cues. SID 03 Digest, pp. 1538-1541, 2003.
Son et al., Evaluating the utility of two gestural discomfort evaluation methods. PLOS One. 2017. 21 pages.
Strbac et al., Microsoft Kinect-Based Artificial Perception System for Control of Functional Electrical Stimulation Assisted Grasping. Hindawi Publishing Corporation. BioMed Research International. 2014. 13 pages.
Takatsuka et al., Retinal projection display using diffractive optical element. Tenth International Conference on Intelligent Information Hiding and Multimedia Signal Processing, IEEE, 2014, pp. 403-406.
Torres, Myo Gesture Control Armband. PCMag. Https://www.pcmag.com/article2/0,2817,2485462,00.asp 2015. 9 pages.
Urey et al., Optical performance requirements for MEMS-scanner based microdisplays. Conf. on MOEMS and Miniaturized Systems. SPIE. 2000;4178:176-185.
Urey, Diffractive exit-pupil expander for display applications. Applied Optics 2001;40(32):5840-5851.
Valero-Cuevas et al., Computational Models for Neuromuscular Function. NIH Public Access Author Manuscript. Jun. 16, 2011. 52 pages.
Viirre et al., The Virtual Retinal Display: A New Technology for Virtual Reality and Augmented Vision in Medicine. Proceedings of Medicine Meets Virtual Reality, IOS Press and Ohmsha, 1998, pp. 252-257. 6 pages.
Wodzinski et al., Sequential Classification of Palm Gestures Based on A* Algorithm and MLP Neural Network for Quadrocopter Control. Metrol. Meas. Syst., 2017;24(2):265-76.
Xue et al., Multiple Sensors Based Hand Motion Recognition Using Adaptive Directed Acyclic Graph. Applied Sciences. MDPI. 2017;7(358):1-14.
Yang et al., Surface EMG based handgrip force predictions using gene expression programming. Neurocomputing. 2016;207:568-579.

\* cited by examiner

SYSTEMS, DEVICES, AND METHODS FOR GESTURE IDENTIFICATION

BACKGROUND

Technical Field

The present systems, devices, and methods generally relate to wearable devices that perform automated gesture identification in real-time, and methods of performing such.

Description of the Related Art

WEARABLE ELECTRONIC DEVICES

Electronic devices are commonplace throughout most of the world today. Advancements in integrated circuit technology have enabled the development of electronic devices that are sufficiently small and lightweight to be carried by the user. Such "portable" electronic devices may include on-board power supplies (such as batteries or other power storage systems) and may be designed to operate without any wire-connections to other electronic systems; however, a small and lightweight electronic device may still be considered portable even if it includes a wire-connection to another electronic system. For example, a microphone may be considered a portable electronic device whether it is operated wirelessly or through a wire-connection.

The convenience afforded by the portability of electronic devices has fostered a huge industry. Smartphones, audio players, laptop computers, tablet computers, and ebook readers are all examples of portable electronic devices. However, the convenience of being able to carry a portable electronic device has also introduced the inconvenience of having one's hand(s) encumbered by the device itself. This problem is addressed by making an electronic device not only portable, but wearable.

A wearable electronic device is any portable electronic device that a user can carry without physically grasping, clutching, or otherwise holding onto the device with their hands. For example, a wearable electronic device may be attached or coupled to the user by a strap or straps, a band or bands, a clip or clips, an adhesive, a pin and clasp, an article of clothing, tension or elastic support, an interference fit, an ergonomic form, etc. Examples of wearable electronic devices include digital wristwatches, electronic armbands, electronic rings, electronic ankle-bracelets or "anklets," head-mounted electronic display units, hearing aids, and so on.

HUMAN-ELECTRONICS INTERFACES

A wearable electronic device may provide direct functionality for a user (such as audio playback, data display, computing functions, etc.) or it may provide a mechanism with which to interact, communicate, or control another electronic device. For example, a wearable electronic device may include sensors that detect inputs effected by a user and the device may transmit signals to another electronic device based on those inputs. Sensor-types and input-types may each take on a variety of forms, including but not limited to: tactile sensors (e.g., buttons, switches, touchpads, or keys) providing manual control, acoustic sensors providing voice-control, electromyography sensors providing gesture control, and/or accelerometers providing gesture control.

A human-computer interface ("HCI") is an example of a human-electronics interface. The present systems, devices, and methods may be applied to HCIs, but may also be applied to any other form of human-electronics interface.

GESTURE IDENTIFICATION SYSTEMS AND DEVICES

A gesture identification system is any system that, in use, detects when a user performs a physical gesture and identifies, classifies, and/or recognizes the gesture that the user has performed. In practice, a gesture identification system may have a limited capacity to identify, classify, and/or recognize a predefined set of gestures and/or gesture types.

A gesture identification system may include multiple physically disparate components or it may comprise a single gesture identification device. In either case, a gesture identification system may include a wearable electronic device with on-board sensors (such as photosensors/cameras (optical, infrared, or otherwise), electromyography sensors, and/or accelerometer sensors) to detect physical gestures performed by the user. In particular, electromyography (or "EMG") sensors may be used to detect the electrical signals produced by muscle activity when the user performs a physical gesture. Human-electronics interfaces that employ EMG sensors have been proposed. For example, U.S. Pat. No. 6,244,873 and U.S. Pat. No. 8,170,656 describe such systems.

In a typical example of such a system, the user dons a wearable EMG device and performs physical gestures to control functions of a separate electronic device. EMG signals corresponding to each user-performed gesture are detected by the wearable EMG device and then either processed by the wearable EMG device itself using an on-board processor or transmitted to a separate computer system for processing. In either case, processing the EMG signals typically involves automatically identifying the corresponding gesture(s) performed by the user based on the EMG signals. It is advantageous to perform gesture identification on-board the wearable EMG device itself (i.e., using an on-board processor) because doing so enables a wider-range of electronic devices to be controlled.

Known proposals for gesture identification systems that employ one or more wearable electronic device(s) (including but not limited to wearable EMG devices) are not immediately able to accurately and reliably identify gestures performed by any generic user or even by the same user under different use conditions (i.e., once the wearable device has been removed and put back on in a different position and/or with a different orientation). On the contrary, known proposals for gesture identification systems that employ one or more wearable electronic device(s) (including the two examples described in the US patents above) typically require any given user to undergo an elaborate training procedure in order to calibrate the wearable device each time the user puts on the device. A typical training procedure, carried out before the system is operable to identify gestures performed by the user (i.e., pre-runtime), requires the user to perform a series of training trials for multiple training gestures (i.e., multiple training trials for each one of multiple training gestures). The system calibrates use parameters based on the signals (e.g., the EMG signals) detected during the training gestures. The quality of the calibration typically increases with the number of training trials performed for each training gesture, so the training procedure may involve many training trials. Once a user has completed the training procedure, the system may perform reasonably well (i.e., during runtime) at identifying gestures of the specific user and under the specific use conditions for which it has been calibrated, but the system may perform very poorly at identifying gestures of other users and/or at identifying gestures of the same user under different use conditions (such as when the user sweats or after the wearable device has been removed and put back on in a different position, with a different rotation, and/or with a different orientation). If a different user wishes to use the wearable device, then that different user must go through the training procedure in order to recalibrate the system to work for them. Furthermore, if the same user removes the wearable device (because, for example, the user has finished using it for a period of time), then that same user typically needs to undergo the training procedure again when the wearable device is re-worn, since any subsequent use of the wearable device may involve slightly different use conditions (such as, for example, different device position, rotation, and/or orientation, and/or different skin conditions such as temperature, moisture, hair density, and so on) which may give rise to different use parameters. The requirement for each user to undergo an elaborate training procedure for each use and the inability to readily identify gestures of any generic user are limitations of known proposals for gesture identification systems employing one or more wearable electronic device(s) that degrade the overall user experience. Clearly, there is a need in the art for gesture identification systems and/or devices that perform gesture identification with improved robustness against variations in use parameters.

BRIEF SUMMARY

A method of operating a gesture identification system to identify a user-performed gesture, the gesture identification system including at least one sensor responsive to (i.e., that in use detects) user-performed gestures and a processor communicatively coupled to the at least one sensor, may be summarized as including: providing at least one signal from the at least one sensor to the processor; segmenting the at least one signal into data windows; for each $i^{th}$ data window in at least a subset of the data windows: determining a window class for the $i^{th}$ data window by the processor, the window class selected by the processor from a library of window classes, wherein each window class in the library of window classes exclusively characterizes at least one data window property; determining, by the processor, a respective probability that each gesture in a gesture library is the user-performed gesture based on a) the window class for the $i^{th}$ data window and, when i>1, b) the window class for at least one $j^{th}$ data window, where j<i; and identifying a highest-probability gesture for the $i^{th}$ data window by the processor, the highest-probability gesture corresponding to the gesture in the gesture library that has a highest probability of being the user-performed gesture for the $i^{th}$ data window; and identifying the user-performed gesture by the processor based on the respective highest-probability gestures for at least two data windows in the at least a subset of data windows. Providing at least one signal from the at least one sensor to the processor may include providing at least one substantially continuous data stream from the at least one sensor to the processor, and segmenting the at least one signal into data windows may include segmenting the at least one substantially continuous data stream into data windows in real-time by the processor.

The method may further include detecting initiation of the user-performed gesture by the processor based on at least one property of at least one data window. Detecting initiation of the user-performed gesture by the processor based on at least one property of at least one data window may include detecting initiation of the user-performed gesture by the processor based on at least one Root Mean Square ("RMS") value for the at least one data window.

Each window class in the library of window classes may exclusively characterize a respective range of values for the same at least one data window property. Each window class in the library of window classes may exclusively characterize a respective range of values for at least one Root Mean Square ("RMS") value for the $i^{th}$ data window.

The at least one sensor may include a plurality of sensors, and: providing at least one signal from the at least one sensor to the processor may include providing a respective signal from each respective sensor in the plurality of sensors to the processor; and segmenting the at least one signal into data windows may include segmenting the signal from each respective sensor in the plurality of sensors into the data windows, wherein each data window includes a respective portion of the signal from each respective sensor in the plurality of sensors. The plurality of sensors may include N sensors, and each window class in the library of window classes may exclusively characterize a respective region in an N-dimensional hyperspace and each dimension of the N-dimensional hyperspace represents a property of the signal from a respective one of the N sensors. Each region of the N-dimensional hyperspace may represent a respective combination of ranges for Root Mean Square ("RMS") values of the signals from the N sensors. For each window class in the library of window classes, the corresponding region in the N-dimensional hyperspace may be exclusively characterized by at least one respective angle formed in the N-dimensional hyperspace.

The at least one sensor may include at least one muscle activity sensor selected from the group consisting of: an electromyography (EMG) sensor and a mechanomyography (MMG) sensor, and providing at least one signal from the at least one sensor to the processor may include providing at least one signal from the at least one muscle activity sensor to the processor. In addition or alternatively, the at least one sensor may include at least one inertial sensor selected from the group consisting of: an accelerometer, a gyroscope, and an inertial measurement unit (IMU), and providing at least one signal from the at least one sensor to the processor may include providing at least one signal from the at least one inertial sensor to the processor.

The gesture identification system may further include a non-transitory processor-readable storage medium that stores processor-executable gesture identification instructions, the non-transitory processor-readable storage medium communicatively coupled to the processor, and the method may further include: executing by the processor the gesture identification instructions to cause the processor to: determine the window class for each $i^{th}$ data window; determine the respective probability that each gesture in the gesture library is the user-performed gesture for each $i^{th}$ data window; identify the highest-probability gesture for each $i^{th}$ data window; and identify the user-performed gesture. The non-transitory processor-readable storage medium may further store the library of window classes and the gesture library.

Determining, by the processor, a respective probability that each gesture in a gesture library is the user-performed gesture may include: determining, by the processor, at least one respective n-gram transition model for each gesture in the gesture library; and determining, by the processor and for each gesture in the gesture library, a probability that the gesture is the user-performed gesture based at least in part on the at least one n-gram transition model for the gesture. Determining, by the processor, at least one respective n-gram transition model for each gesture in the gesture library may include determining, by the processor and for each gesture in the gesture library, at least one respective n-gram transition model selected from the group consisting of: a unigram transition model based on the window class of the $i^{th}$ data window and a bigram transition model based on the respective window classes of the $i^{th}$ data window and the $j^{th}=(i-1)^{th}$ data window.

For each $i^{th}$ data window, determining, by the processor, a respective probability that each gesture in a gesture library is the user-performed gesture may include determining, by the processor, a respective probability that each gesture in the gesture library is the user-performed gesture based on a) the window class for the $i^{th}$ data window and b) the window class for a single $j^{th}$ data window, where j is selected from the group consisting of: j=(i−1) and j<(i−1).

The gesture identification system may comprise a wearable gesture identification device that includes the at least one sensor and the processor, the wearable gesture identification device in use worn on a limb of the user, and: for each $i^{th}$ data window in the at least a subset of the data windows: determining a window class for the $i^{th}$ data window by the processor may include determining a window class for the $i^{th}$ data window by the processor of the wearable gesture identification device; determining, by the processor, a respective probability that each gesture in a gesture library is the user-performed gesture may include determining, by the processor of the wearable gesture identification device, a respective probability that each gesture in the gesture library is the user-performed gesture; and identifying a highest-probability gesture for the $i^{th}$ data window by the processor may include identifying a highest-probability gesture for the $i^{th}$ data window by the processor of the wearable gesture identification device; and identifying the user-performed gesture by the processor may include identifying the user-performed gesture by the processor of the wearable gesture identification device.

A gesture identification system may be summarized as including at least one sensor responsive to (i.e., to detect, sense, measure, or transduce) a physical gesture performed by a user of the gesture identification system, wherein in response to a physical gesture performed by the user the at least one sensor provides at least one signal; a processor communicatively coupled to the at least one sensor; and a non-transitory processor-readable storage medium communicatively coupled to the processor, wherein the non-transitory processor-readable storage medium stores processor-executable gesture identification instructions that, when executed by the processor, cause the gesture identification device to: segment the at least one signal into data windows; for each $i^{th}$ data window in at least a subset of the data windows: determine a window class for the $i^{th}$ data window, the window class selected from a library of window classes, wherein each window class in the library of window classes exclusively characterizes at least one data window property; determine a respective probability that each gesture in a gesture library is the gesture performed by the user based on a) the window class for the $i^{th}$ data window and, when i>1, b) the window class for at least one $j^{th}$ data window, where j<i; and identify a highest-probability gesture for the $i^{th}$ data window, the highest-probability gesture corresponding to the gesture in the gesture library that has a highest probability of being the gesture performed by the user for the $i^{th}$ data window; and identify the gesture performed by the user based on the respective highest-probability gestures for at least two data windows in the at least a subset of data windows. The at least one sensor may include a sensor selected from the group consisting of: a muscle activity sensor, an electromyography (EMG) sensor, a mechanomyography (MMG) sensor, an inertial sensor, an accelerometer, a gyroscope, and an inertial measurement unit (IMU).

The gesture identification system may further include a communication terminal communicatively coupled to the processor to in use transmit at least one signal in response to the processor identifying the gesture performed by the user.

The gesture identification system may further include a wearable gesture identification device comprising a band that in use is worn on a limb of the user, wherein the at least one sensor, the processor, and the non-transitory processor-readable storage medium are all carried by the band. The wearable gesture identification device may further include a set of pod structures that form physically coupled links of the wearable gesture identification device, wherein each pod structure in the set of pod structures is positioned adjacent and in between two other pod structures in the set of pod structures and physically coupled to the two other pod structures in the set of pod structures by the band, and wherein the set of pod structures forms a perimeter of an annular configuration.

Each window class in the library of window classes may exclusively characterize a respective range of values for the same at least one data window property.

The at least one sensor may include a plurality of sensors, each of which is responsive to physical gestures performed by the user, and the processor-executable gesture identification instructions, when executed by the processor, may cause the gesture identification device to: segment the respective signal from each respective sensor in the plurality of sensors into the data windows, wherein each data window includes a respective portion of the signal from each respective sensor in the plurality of sensors.

The at least one sensor may include N sensors, when N≥1, and each window class in the library of window classes may exclusively characterize a respective region in an N-dimensional hyperspace, each dimension of the N-dimensional hyperspace representing a property of the signal from a respective one of the N sensors. Each region of the N-dimensional hyperspace may represent a respective combination of ranges for Root Mean Square ("RMS") values of the signals from the N sensors. For each window class in the library of window classes, the corresponding region in the N-dimensional hyperspace may be exclusively characterized by at least one respective angle formed in the N-dimensional hyperspace.

A method of operating a gesture identification system to identify a user-performed gesture, the gesture identification system including at least one sensor that is responsive to (i.e., that in use detects) user-performed gestures and a processor communicatively coupled to the at least one sensor, may be summarized as including: in response to a user-performed gesture, providing at least one signal from the at least one sensor to the processor; segmenting the at least one signal into data windows; for each data window in at least a subset of the data windows, assigning a window class to the data window by the processor, each respective window class selected by the processor from a library of window classes, wherein each window class in the library of window classes exclusively characterizes at least one data window property; and identifying the user-performed gesture by the processor based at least in part on the respective window classes of at least two data windows.

The at least one sensor may include N sensors, where N≥1, and each window class in the library of window classes may exclusively characterize a respective region in an N-dimensional hyperspace and each dimension of the N-dimensional hyperspace may represent a property of the signal from a respective one of the N sensors. Each region of the N-dimensional hyperspace may represent a respective combination of ranges for Root Mean Square ("RMS") values of the signals from the N sensors. For each window class in the library of window classes, the corresponding region in the N-dimensional hyperspace may be exclusively characterized by at least one respective angle formed in the N-dimensional hyperspace.

Providing at least one signal from the at least one sensor to the processor may include providing at least one substantially continuous data stream from the at least one sensor to the processor, and segmenting the at least one signal into data windows may include segmenting the at least one substantially continuous data stream into data windows in real-time by the processor.

The method may further include detecting initiation of the user-performed gesture by the processor based on at least one property of at least one data window. Detecting initiation of the user-performed gesture by the processor based on at least one property of at least one data window may include detecting initiation of the user-performed gesture by the processor based on at least one Root Mean Square ("RMS") value for the at least one data window.

Each window class in the library of window classes may exclusively characterize a respective range of values for the same at least one data window property. Each window class in the library of window classes may exclusively characterize a respective range of values for at least one data window Root Mean Square ("RMS") value.

The at least one sensor may include a plurality of sensors, and: providing at least one signal from the at least one sensor to the processor may include providing a respective signal from each respective sensor in the plurality of sensors to the processor; and segmenting the at least one signal into data windows may include segmenting the respective signal from each respective sensor in the plurality of sensors into the data windows, wherein each data window includes a respective portion of the signal from each respective sensor in the plurality of sensors.

The method may further include: determining, by the processor, a respective probability that each gesture in a gesture library is the user-performed gesture based on the respective window classes of at least two data windows, and identifying the user-performed gesture by the processor may include identifying, by the processor, a highest-probability gesture, the highest-probability gesture corresponding to a gesture in the gesture library that has a highest probability of being the user-performed gesture. Determining, by the processor, a respective probability that each gesture in a gesture library is the user-performed gesture may include: determining, by the processor, at least one respective n-gram transition model for each gesture in the gesture library; and determining, by the processor and for each gesture in the gesture library, a probability that the gesture is the user-performed gesture based at least in part on the at least one n-gram transition model for the gesture. Determining, by the processor, at least one respective n-gram transition model for each gesture in the gesture library may include determining, by the processor and for each gesture in the gesture library, at least one respective n-gram transition model selected from the group consisting of: a unigram transition model based on the window class of a single data window and a bigram transition model based on the respective window classes of two data windows.

The at least one sensor may include at least one muscle activity sensor selected from the group consisting of: an electromyography (EMG) sensor and a mechanomyography (MMG) sensor, and providing at least one signal from the at least one sensor to the processor may include providing at least one signal from the at least one muscle activity sensor to the processor. Either in addition or alternatively, the at least one sensor may include at least one inertial sensor selected from the group consisting of: an accelerometer, a gyroscope, and an inertial measurement unit (IMU), and providing at least one signal from the at least one sensor to the processor may include providing at least one signal from the at least one inertial sensor to the processor.

The gesture identification system may further include a non-transitory processor-readable storage medium that stores processor-executable gesture identification instructions, the non-transitory processor-readable storage medium communicatively coupled to the processor, and the method may further include: executing by the processor the gesture identification instructions to cause the processor to: for each data window in at least a subset of the data windows, assign the window class to the data window; and identify the user-performed gesture based at least in part on the respective window classes of at least two data windows. The non-transitory processor-readable storage medium may further store the library of window classes and the gesture library.

The gesture identification system may comprise a wearable gesture identification device that includes the at least one sensor and the processor, the wearable gesture identification device in use worn on a limb of the user, and: for each data window in at least a subset of the data windows, assigning a window class to the data window by the processor may include assigning a window class to the data window by the processor of the wearable gesture identification device; and identifying the user-performed gesture by the processor may include identifying the user-performed gesture by the processor of the wearable gesture identification device.

A gesture identification system may be summarized as including at least one sensor responsive to (i.e., to detect, sense, measure, or transduce) a physical gesture performed by a user of the gesture identification system, wherein in response to a physical gesture performed by the user the at least one sensor provides at least one signal; a processor communicatively coupled to the at least one sensor; and a non-transitory processor-readable storage medium communicatively coupled to the processor, wherein the non-transitory processor-readable storage medium stores processor-executable gesture identification instructions that, when executed by the processor, cause the gesture identification device to: segment the at least one signal into data windows; for each data window in at least a subset of the data windows, assign a window class to the data window; and identify the physical gesture performed by the user based at least in part on the respective window classes of at least two data windows. The at least one sensor may include a sensor selected from the group consisting of: a muscle activity sensor, an electromyography (EMG) sensor, a mechanomyography (MMG) sensor, an inertial sensor, an accelerometer, a gyroscope, and an inertial measurement unit (IMU).

The gesture identification system may further include a communication terminal communicatively coupled to the processor to in use transmit at least one signal in response to the processor identifying the physical gesture performed by the user.

The gesture identification system may further include a wearable gesture identification device comprising a band that in use is worn on a limb of the user, wherein the at least one sensor, the processor, and the non-transitory processor-readable storage medium are all carried by the band. The wearable gesture identification device may further include a set of pod structures that form physically coupled links of the wearable gesture identification device, wherein each pod structure in the set of pod structures is positioned adjacent and in between two other pod structures in the set of pod structures and physically coupled to the two other pod structures in the set of pod structures by the band, and wherein the set of pod structures forms a perimeter of an annular configuration.

Each window class in the library of window classes may exclusively characterize a respective range of values for the same at least one data window property.

The at least one sensor may include N sensors, where N≥1, and each window class in the library of window classes may exclusively characterize a respective region in an N-dimensional hyperspace and each dimension of the N-dimensional hyperspace may represent a property of the signal from a respective one of the N sensors. Each region of the N-dimensional hyperspace may represent a respective combination of ranges for Root Mean Square ("RMS") values of the signals from the N sensors. For each window class in the library of window classes, the corresponding region in the N-dimensional hyperspace may be exclusively characterized by at least one respective angle formed in the N-dimensional hyperspace.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

Figure 1:
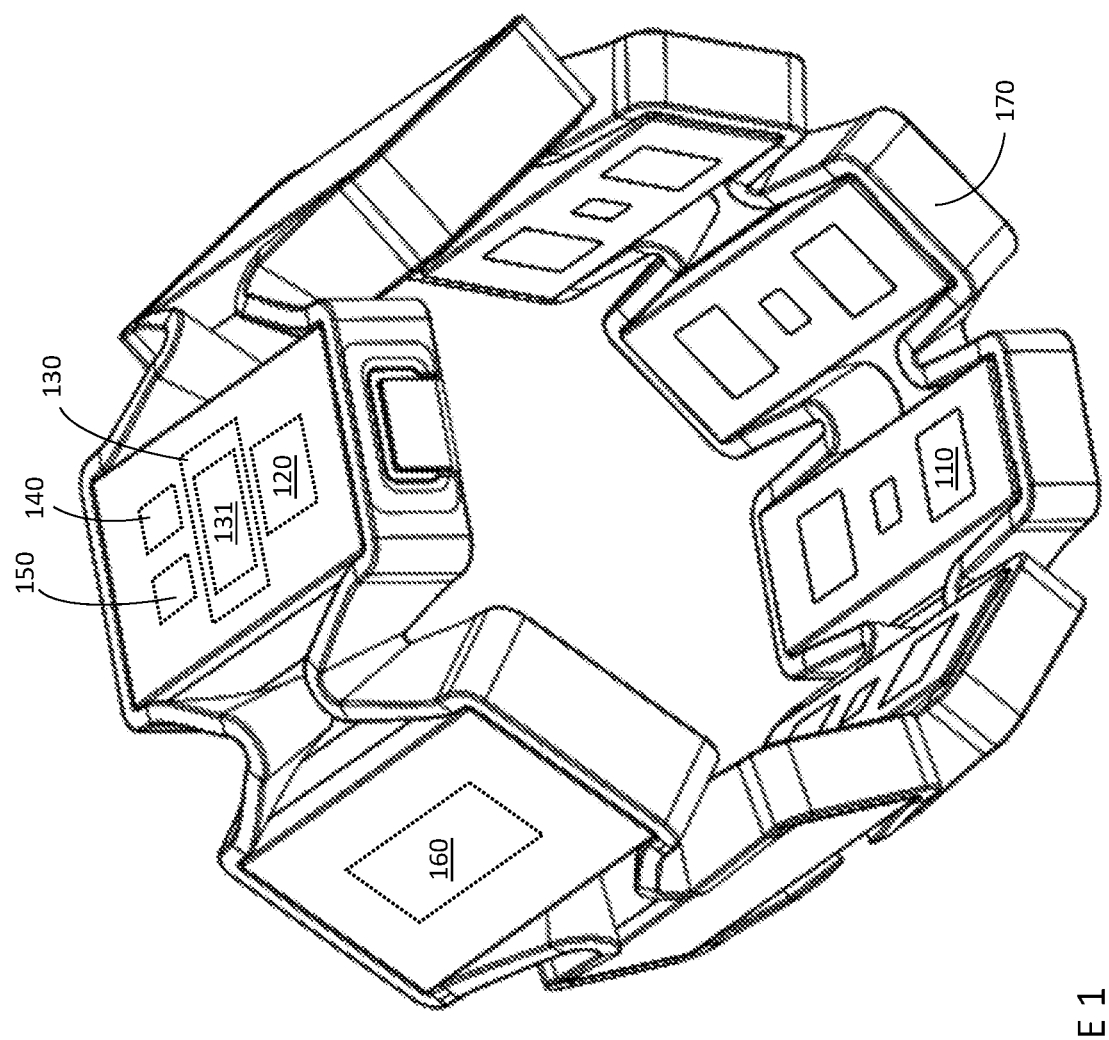
FIG. 1 is a perspective view of an exemplary gesture identification system comprising a wearable gesture identification device that performs automated gesture identification with improved robustness against variations in use parameters and with limited computational resources in accordance with the present systems, devices, and methods.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with electronic devices, and in particular portable electronic devices such as wearable electronic devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, devices, and methods for gesture identification with improved robustness against variations in use parameters. This improved robustness enables reliable and accurate gesture identification for most generic users and/or under most generic use conditions without requiring the user to undergo an elaborate training procedure. Furthermore, the gesture identification methods described herein require only limited computational resources, which provides numerous benefits for wearable gesture identification devices, including without limitation: extending battery life, enhancing the speed of the gesture identification process, enhancing the quality of the gesture identification, simplifying the on-board processor and associated infrastructure, reducing cost, and reducing overall mass and complexity.

Throughout this specification and the appended claims, the term "gesture" is used to generally refer to a deliberate physical action (e.g., a movement, a stretch, a flex, a pose) performed or otherwise effected by a user. Any physical action deliberately performed or otherwise effected by a user that involves detectable signals (such as muscle activity detectable by at least one appropriately positioned muscle activity sensor, e.g., an electromyography sensor, and/or motion detectable by at least one appropriately positioned inertial sensor, e.g., an accelerometer and/or a gyroscope, and/or motion/posturing detectable by at least one optical sensor, e.g., an infrared sensor) may constitute a gesture in the present systems, devices, and methods.

FIG. 1 is a perspective view of an exemplary gesture identification system comprising a wearable gesture identification device 100 that performs automated gesture identification with improved robustness against variations in use parameters and with limited computational resources in accordance with the present systems, devices, and methods. Exemplary wearable gesture identification device 100 may, for example, form part of a human-electronics interface. Device 100 is an armband designed to be worn on the forearm of a user, though a person of skill in the art will appreciate that the teachings described herein may readily be applied in gesture identification systems employing one or more wearable electronic device(s) designed to be worn elsewhere on the body of the user, including without limitation: on the upper arm, wrist, hand, finger, leg, foot, torso, or neck of the user (and/or in gesture identification systems that are not worn on the user, such as optical- or infrared-based systems). Some details that may be included in exemplary wearable gesture identification device 100 are described in at least U.S. Non-Provisional patent application Ser. No. 14/186,878 (now US Patent Publication 2014-0240223), U.S. Non-Provisional patent application Ser. No. 14/186,889 (now US Patent Publication 2014-0240103), U.S. Non-Provisional patent application Ser. No. 14/276,575 (now US Patent Publication 2014-0334083), U.S. Provisional Patent Application Ser. No. 61/909,786 (now U.S. Non-Provisional patent application Ser. No. 14/553,657), U.S. Provisional Patent Application Ser. No. 61/940,048 (now U.S. Non-Provisional patent application Ser. No. 14/621,044), U.S. Provisional Patent Application Ser. No. 61/971,346 (now U.S. Non-Provisional patent application Ser. No. 14/669,878), and U.S. Provisional Patent Application Ser. No. 61/869,526 (now US Patent Publication 2015-0057770), each of which is incorporated herein by reference in its entirety.

In accordance with the present systems, devices, and methods, a gesture identification system includes sensors responsive to (i.e., to detect, sense, measure, or transduce) user-performed gestures and to provide one or more signal(s) in response to a user-performed gesture. As examples, device 100 includes muscle activity sensors 110 (only one called out in FIG. 1) responsive to (i.e., to detect, sense, measure, or transduce) muscle activity involved when the user performs a physical gesture. Muscle activity sensors 110 may include, for example, electromyography (EMG) sensors responsive to (i.e., to detect, sense, measure, or transduce) electrical signals generated by muscle activity and/or mechanomyography (MMG) sensors responsive to (i.e., to detect, sense, measure, or transduce) vibrations generated by muscle activity. Device 100 also includes an inertial sensor 140, such as an accelerometer, gyroscope, or an inertial measurement unit (IMU) (e.g., an MPU-9150 Nine-Axis MEMS MotionTracking™ Device from InvenSense), responsive to (i.e., to detect, sense, measure, or transduce) motion involved when the user performs a physical gesture. A person of skill in the art will appreciate that the combination of muscle activity sensors 110 and inertial sensor(s) 140 in device 100 is used herein as an example of a sensor configuration responsive to (i.e., to detect, sense, measure, or transduce) user-performed gestures, while alternative implementations of gesture identification systems may employ one or more other sensor type(s) and/or either muscle activity sensors or inertial sensors on their own.

Sensors 110 and 140 provide signals in response to user-performed gestures. In order to process these signals, device 100 includes an on-board processor 120 communicatively coupled to sensors 110 and 140. Processor 120 may be any type of processor, including but not limited to: a digital microprocessor or microcontroller, an application-specific integrated circuit (ASIC), a field-programmable gate array (FPGA), a digital signal processor (DSP), a graphics processing unit (GPU), a programmable gate array (PGA), a programmable logic unit (PLU), or the like. The methods and techniques by which processor 120 processes the signals from sensors 110 and 140 are controlled by processor-executable gesture identification instructions 131 stored in a non-transitory processor-readable storage medium or memory 130 communicatively coupled to processor 120. When executed by processor 120, gesture identification instructions 131 cause device 100 to identify one or more user-performed gesture(s) based on the signals provided by sensors 110 and 140 in accordance with the present systems, devices, and methods.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

In addition to sensors 110 and 140, processor 120, and memory 130, device 100 also includes a battery 160 to power device 100 and at least one communication terminal 150 to transmit at least one signal in response to processor 120 identifying a user-performed gesture. Throughout this specification and the appended claims, the term "communication terminal" is generally used to refer to any physical structure that provides a telecommunications link through which a data signal may enter and/or leave a device. A communication terminal represents the (or "terminus") of communicative signal transfer within a device and the beginning of communicative signal transfer to/from an external device (or external devices). As examples, communication terminal 150 of device 100 may include a wireless transmitter that implements a known wireless communication protocol, such as Bluetooth®, WiFi®, or Zigbee®, and/or a tethered communication port such as Universal Serial Bus (USB) port, a micro-USB port, a Thunderbolt® port, and/or the like. Device 100 also includes a set of eight pod structures (not called out in FIG. 1 to reduce clutter) that form physically coupled links of the wearable gesture identification device 100. Each pod structure in the set of eight pod structures carries a respective muscle activity sensor 110 and is positioned adjacent and in between two other pod structures in the set of eight pod structures such that the set of eight pod structures forms a perimeter of an annular or closed loop configuration. Respective pairs of pod structures are physically coupled together and held in the annular or closed loop configuration by at least one band 170 that in use is worn around a limb of the user (e.g., around the user's forearm). Thus, sensors 110 and 140, processor 120, memory 130, battery 160, and communication terminal 150 are all carried by band 170.

Throughout this specification and the appended claims, the term "pod structure" is used to refer to an individual link, segment, pod, section, structure, component, etc. of a wearable electronic device. For the purposes of the present systems, devices, and methods, an "individual link, segment, pod, section, structure, component, etc." (i.e., a "pod structure") of a wearable electronic device is characterized by its ability to be moved or displaced relative to another link, segment, pod, section, structure component, etc. of the wearable electronic device. Device 100 includes eight pod structures, but wearable electronic devices employing pod structures (e.g., device 100) are used herein as exemplary devices only and the present systems, devices, and methods may be applied to/with wearable electronic devices that do not employ pod structures or that employ any number of pod structures.

Throughout this specification and the appended claims, the terms "gesture identification system" and "wearable gesture identification device" are used substantially interchangeably because a wearable gesture identification device is used as an example of a gesture identification system herein. The methods described herein may be implemented using a gesture identification system that may or may not include, comprise, or consist entirely of a wearable gesture identification device. For greater certainty, a "gesture identification system" and a "wearable gesture identification device" both include at least one sensor responsive to (i.e., to detect, sense, measure, or transduce) user-performed gestures and a processor communicatively coupled to the at least one sensor. In a "gesture identification system," the at least one sensor and the processor may both be components of a single device or they may each be respective components of two or more physically disparate devices, whereas a "gesture identification device" is a single device that comprises both the at least one sensor and the processor. Thus, in the examples of the gesture identification methods that follow, in a "wearable gesture identification device" the gesture identification acts performed, carried out, and/or completed by a processor (collectively, the "gesture identification process") are generally performed, carried out, and/or completed on-board the wearable gesture identification device by an on-board processor, whereas in a gesture identification system the gesture identification process may be performed, carried out, and/or completed by a processor on-board a wearable component of the system or by a processor that is physically separate from a wearable component of the system (such as by the processor of a laptop or desktop computer).

The various embodiments described herein provide methods, algorithms, and/or techniques for performing automated gesture identification with enhanced robustness against variations in use parameters, as well as exemplary wearable gesture identification devices, such as device 100, that in use implement such methods, algorithms, and/or techniques. Throughout the descriptions of the methods, algorithms, and/or techniques that follow, reference is often made to the elements of device 100 from FIG. 1. A person of skill in the art will appreciate that the elements of device 100 are cited in relation to various acts as illustrative examples only and that the various methods, algorithms, and/or techniques described herein may be implemented using gesture identification systems and/or devices that differ from exemplary device 100 illustrated in FIG. 1. The scope of the present systems, devices, and methods should be construed based on the appended claims and not based on the illustrative example embodiments described in this specification. For this reason, throughout the remainder of this description references to elements of device 100 from FIG. 1 are placed in parentheses to indicate that such references are non-limiting and used for illustrative purposes only.

Figure 2:
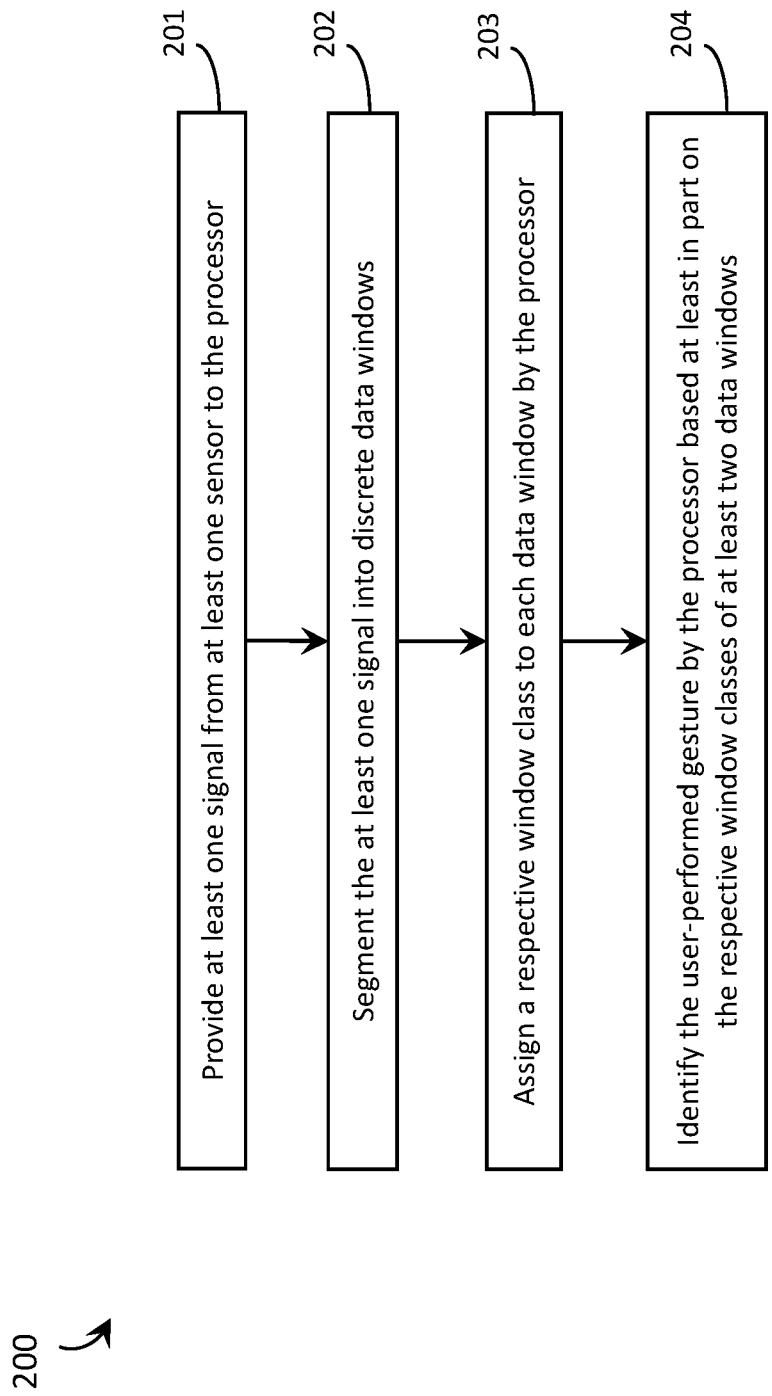
FIG. 2 is a flow-diagram showing a method of operating a gesture identification system to identify a user-performed gesture in accordance with the present systems, devices, and methods.

FIG. 2 is a flow-diagram showing a method 200 of operating a gesture identification system (100) to identify a user-performed gesture in accordance with the present systems, devices, and methods. The gesture identification system (100) includes at least one sensor (110 and/or 140) and a processor (120) and may form part of a human-electronics interface in which the gesture identification system (100) is used to provide gesture-based interaction with and/or control of another electronic device.

Throughout this specification and the appended claims, "identifying" a user-performed gesture means associating at least one signal provided by one or more sensor(s) (110 and/or 140) with a particular physical gesture. In the various embodiments described herein, "identifying" a gesture includes determining which gesture in a gesture library has the highest probability (relative to the other gestures in the gesture library) of being the physical gesture that a user has performed or is performing in order to produce the signal(s) upon which the gesture identification is at least partially based, and returning that gesture as the "identity" of the user-performed gesture. Throughout this specification and the appended claims, the term "gesture library" is used to generally describe a set of physical gestures that a gesture identification system (100) is operative to identify. The gesture identification systems, devices, and methods described herein may not be operative to identify any arbitrary gesture performed by a user. Rather, the gesture identification systems, devices, and methods described herein may be operative to identify when a user performs one of a specified set of gestures, and that specified set of gestures is referred to herein as a gesture library. A gesture library may include any number of gestures, though a person of skill in the art will appreciate that the precision/accuracy of gesture identification may be inversely related to the number of gestures in the gesture library. A gesture library may be expanded by adding one or more gesture(s) or reduced by removing one or more gesture(s). Furthermore, in accordance with the present systems, devices, and methods, a gesture library may include a "rest" gesture corresponding to a state for which no activity is detected and/or an "unknown" gesture corresponding to a state for which activity is detected but the activity does not correspond to any other gesture in the gesture library.

Method 200 includes four acts 201, 202, 203, and 204, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments. For the purpose of the present systems, devices, and methods, the term "user" refers to a person that is wearing the wearable gesture identification device (100).

At 201, at least one sensor (110 and/or 140) of the gesture identification system (100) provides at least one signal to the processor (120). Throughout this specification and the appended claims, the term "provide" and variants such as "provided" and "providing" are frequently used in the context of signals. Unless the specific context requires otherwise, the term "provide" is used in a most general sense to cover any form of providing a signal, including but not limited to: relaying a signal, outputting a signal, generating a signal, routing a signal, creating a signal, transducing a signal, and so on. For example, a surface EMG sensor may include at least one electrode that resistively or capacitively couples to electrical signals from muscle activity. This coupling induces a change in a charge or electrical potential of the at least one electrode which is then relayed through the sensor circuitry and output, or "provided," by the sensor. Thus, the surface EMG sensor may "provide" an electrical signal by relaying an electrical signal from a muscle (or muscles) to an output (or outputs). In contrast, an inertial sensor may include components (e.g., piezoelectric, piezoresistive, capacitive, etc.) that are used to convert physical motion into electrical signals. The inertial sensor may "provide" an electrical signal by detecting motion and generating an electrical signal in response to the motion.

Providing at least one signal from the at least one sensor (110 and/or 140) to the processor (120) at 201 may include providing at least one substantially continuous (i.e., time-varying) data stream from the at least one sensor (110 and/or 140) to the processor (120). In implementations in which the at least one sensor (110 and/or 140) includes a plurality of sensors (as in exemplary device 100), a respective signal may be provided to the processor (120) at 201 from each respective one of multiple (e.g., all) sensors (110 and/or 140) in the plurality of sensors.

At 202, the at least one signal provided from the at least one sensor (110 and/or 140) to the processor (120) at 201 is segmented into discrete data windows. This segmenting may be done by the processor (120), by elements of the sensors (110 and/or 140), or by some intermediate circuitry communicatively coupled in between the processor (120) and the sensors (110 and/or 140). For the purposes of the present systems, devices, and methods, the term "data window" refers to a particular section, parcel, segment, excerpt, subset, or portion of data from a larger collection of data, where the data in the data window all satisfy at least one bound or constraint. As an example, a data window may correspond to data collected within a defined range of a larger space of time. Thus, for data collected over a time period T, a data window may correspond to data collected during a portion t of the full time period T, where t<T.

Segmenting the at least one signal into discrete data windows per 202 generally includes segmenting the at least one signal into multiple data windows. Successive data windows (e.g., respective portions $t_i$ collected over a time period T) may be sequential, they may overlap, or there may be gaps therebetween. Thus, the term "discrete" in "discrete data windows" denotes that each data window is a respective section, parcel, segment, excerpt, subset, or portion of data from the larger collection of data and does not necessarily mean that there is no data in common between multiple data windows (e.g., as in the case of overlapping data windows). If the at least one signal provided by the at least one sensor (110 and/or 140) at 201 is a substantially continuous data stream, then at 202 the processor (120) may segment the at least one substantially continuous data stream into discrete data windows in real-time; that is, the processor (120) may segment the continuous data stream as the data stream comes into the processor (120) without first storing or archiving the data stream in a physically separate memory (though the data may be temporarily stored in a register or CPU cache of the processor (120) itself as part of normal processor operation). In implementations in which the at least one sensor (110 and/or 140) includes a plurality of sensors (as in exemplary device 100), act 202 may include segmenting the respective signal from each respective sensor (110 or 140) in the plurality of sensors into the same discrete data windows. For example, each $i^{th}$ data window (110 and/or 140) may correspond to the same $i^{th}$ window of time, $t_i$, for the signal from each respective sensor, and each data window may include a respective portion of the signal from each respective sensor. An exemplary illustration of segmenting multiple signals into the same discrete data windows per 202 is provided in FIG. 3.

Figure 3:
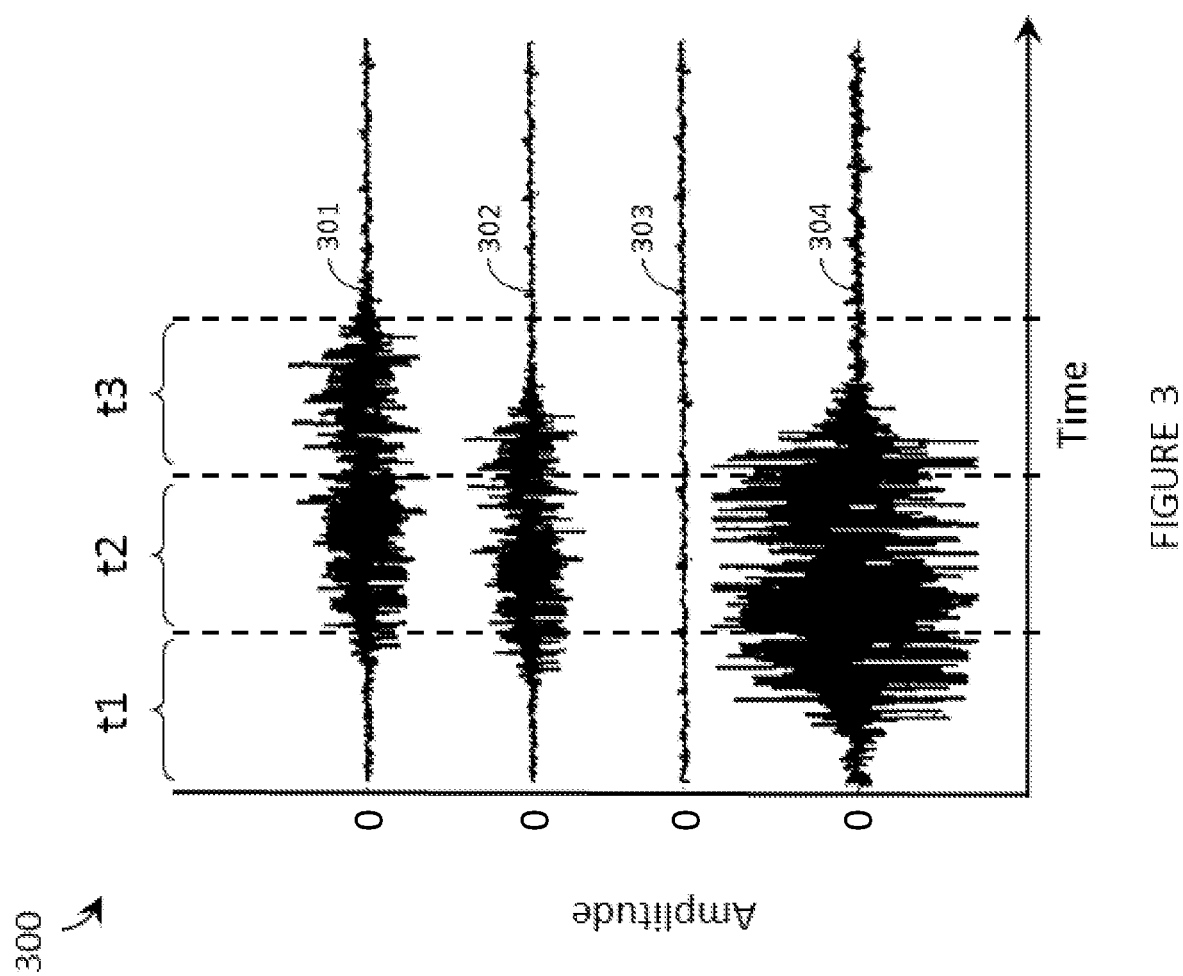
FIG. 3 is a graph showing an exemplary set of four signals corresponding to respective signal channels provided by each of four sensors in a gesture identification system in accordance with the present systems, devices, and methods.

FIG. 3 is a graph 300 showing an exemplary set of four signals 301, 302, 303, and 304 corresponding to respective signal channels provided by each of four sensors (e.g., muscle activity sensors 110 such as EMG or MMG sensors) in a gesture identification system in accordance with the present systems, devices, and methods. Each signal 301, 302, 303, and 304 in the set of four signals represents a respective substantially continuous data stream characterized by a respective amplitude (e.g., voltage) that varies over time.

For the data depicted in FIG. 3, each muscle activity sensor (110) of the gesture identification system (100) is positioned at a different location on the user (e.g., oriented around or about the circumference of an armband such as in device 100) and is therefore uniquely positioned relative to various muscles of the user. For example, the muscle activity sensor (110) that provides signal 303 is positioned relatively close to a first muscle of the user and relatively far from a second muscle of the user, while the muscle activity sensor (110) that provides signal 304 is positioned relatively far from the first muscle of the user and relatively close to the second muscle of the user. During the time period that is depicted in FIG. 3, the user performs a physical gesture (i.e., a user-performed gesture) that involves substantial activity of some muscles (e.g., substantial activity of the second muscle) and no substantial (or insubstantial) activity of other muscles (e.g., insubstantial activity of the first muscle). Thus, each muscle activity sensor (110) in the gesture identification system (100) detects, senses, measures, or transduces different muscle activity during the gesture and, accordingly, each muscle activity sensor (110) provides a different signal. As will be described in more detail later, the time period when the user performs the gesture may correspond to a time period during which the amplitude of one or more of signals 301, 302, 303, and 304 exceeds some threshold.

Signals 301, 302, 303, and 304 represent signals provided by respective muscle activity sensors (110) for the duration of a user-performed gesture. The muscle activity sensors (110) providing signals 301, 302, and 304 detect substantial muscle activity during the user-performed gesture (and therefore provide signals of substantial amplitude) while the muscle activity sensor (110) providing signal 303 does not detect substantial muscle activity during the user-performed gesture (and therefore does not provide a signal of substantial amplitude).

As previously described, at 202 of method 200 the at least one signal provided by the at least one sensor (110) is segmented into discrete data windows. Graph 300 of FIG. 3 depicts an example of segmentation of four signals 301, 302, 303, and 304 into three data windows t1, t2, and t3. A person of skill in the art will appreciate that three data windows (and four signal channels) is used herein as an example of data window segmentation, while in practice any number of data windows may be employed (including significantly more than three data windows).

Each of data windows t1, t2, and t3 encapsulates data from all four signals 301, 302, 303, and 304 for a respective window of time. Specifically, data window t1 includes respective first portions from each of signals 301, 302, 303, and 304, the respective first portions contained within the same window of time t1 for each of sensors 301, 302, 303, and 304; window t2 includes respective second portions from each of signals 301, 302, 303, and 304, the respective second portions contained within the same window of time t2 for each of sensors 301, 302, 303, and 304; and window t3 includes respective third portions from each of signals 301, 302, 303, and 304, the respective third portions contained within the same window of time t3 for each of sensors 301, 302, 303, and 304. Exemplary data windows t1, t2, and t3 are sequential in FIG. 3 for illustrative purposes, though as previously described data windows may overlap or there may be gaps therebetween.

Returning to method 200, at 203 the processor (120) assigns a respective "window class" to each data window (e.g., each of data windows t1, t2, and t3 from FIG. 3). The present systems, devices, and methods introduce the concept of the window class in gesture identification systems, devices, and methods. The "window class" and related concepts introduced herein may be understood, at least in part, by analogy to certain natural language processing schemes, such as speech recognition and predictive text. In natural language processing, combinations and permutations of letters from an alphabet are classified as words. Predictive text algorithms, for example, strive to identify a word in real-time based on a sequence of letters input by a user. The goal of such algorithms is, generally, to correctly identify the word even before the user has finished inputting its entire sequence of letters. Analogously, in the gesture identification systems, devices, and methods described herein, a goal is to correctly identify a user-performed gesture in real-time based on incoming data from one or more sensor(s), where possible even before the user has entirely completed the gesture. The present systems, devices, and methods introduce "window classes" in gesture identification as, at least in part, analogues to the "letters" (or phonemes, syllables, etc.) of natural language processing. In this framework, a user-performed gesture is, at least in part, analogous to a "word," where the gesture is comprised of a sequence of "window classes" in a similar way to how a word is comprised of a sequence of letters. Thus, for each data window, the processor (120) assigns a window class to the data window by selecting an appropriate window class from a library of window classes, the library of window classes being analogous, at least in part, to an alphabet.

Throughout this specification and the appended claims, each window class in a library of window classes may represent a particular configuration of one or more sensor signal parameter(s) in, over, or for the interval of a single data window. In general, each window class in the library of window classes exclusively characterizes at least one data window property. In some implementations, all window classes may exclusively characterize a respective range of values for the same data window property. The at least one data window property characterized by a window class may be averaged or otherwise expressed over the entire data window interval. For example, for a gesture identification system (100) employing muscle activity sensors (110), the at least one signal (e.g., 301, 302, 303, and/or 304) provided by each sensor (110) may include a time-varying voltage signal and the data window property exclusively characterized by each window class may include a Root Mean Square ("RMS") value (e.g., a particular range of RMS values) for the time-varying voltage signal over the data window interval. Other properties that may be averaged or otherwise characterized over an entire data window include, without limitation: a mean of the signal amplitude over the data window, a median of the signal amplitude over the data window, a mode of the signal over the data window, a mean power frequency of the signal over the data window, a maximum value of the signal over the data window, a variation of the signal over the data window, and/or a standard deviation of the signal over the data window. Throughout the remainder of this specification, the RMS value of a data window is used as an example of a data window property upon which window class definitions may be based; however, the present systems, devices, and methods are not limited to implementations in which window classes are defined by RMS values. In general, any data window property or data window properties (i.e., any combination of data window properties) may be used to define window classes in accordance with the present systems, devices, and methods.

Figure 4:
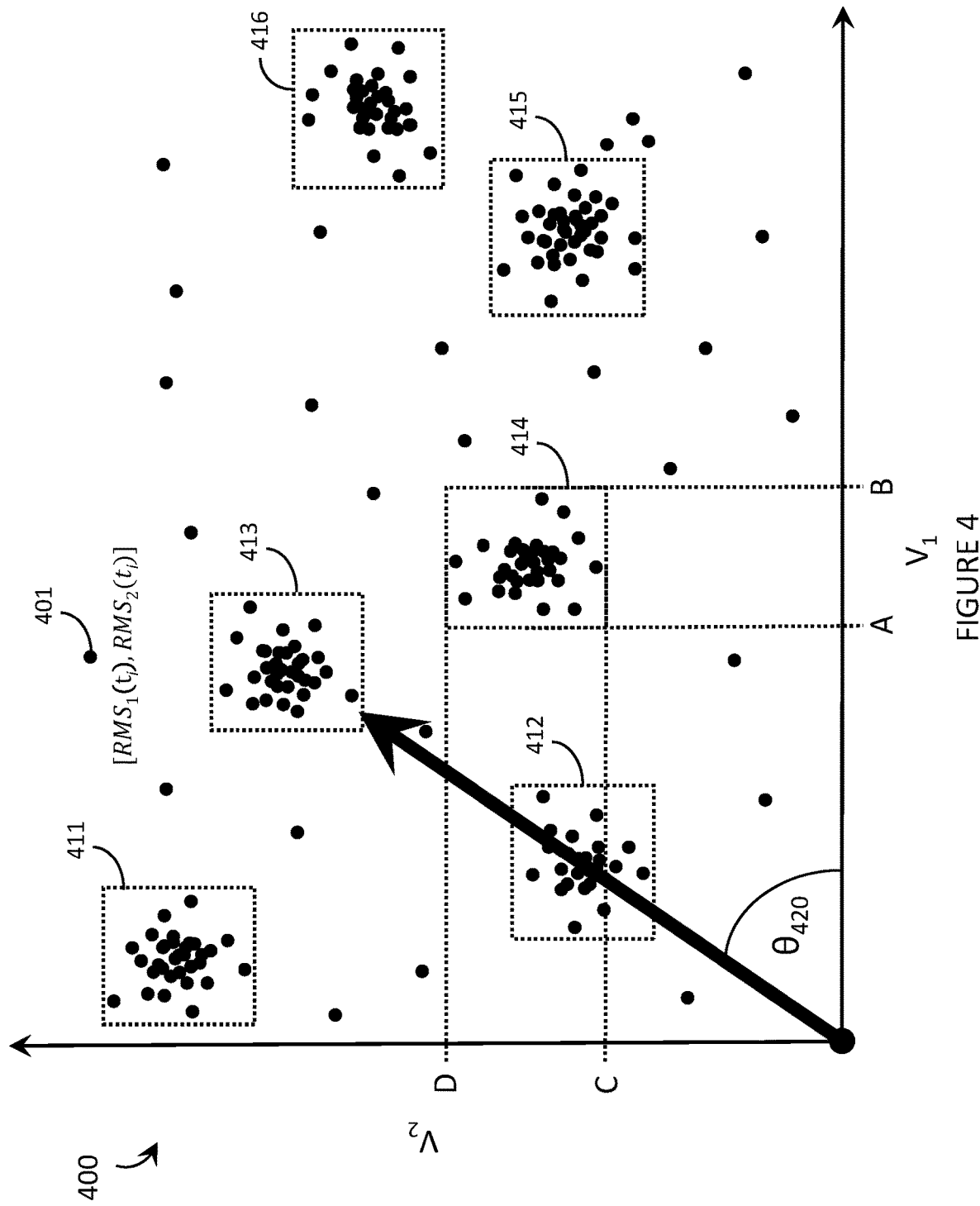
FIG. 4 is a graph showing an exemplary collection of data points plotted in a two-dimensional space, where each data point represents a respective data window collected and saved by a gesture identification system during a data collection or training phase in accordance with the present systems, devices, and methods.

A library or "alphabet" of window classes may be defined, developed, generated, and/or created by analyzing a collection of data windows. For example, in a "data collection" or "training" phase, one or many gesture identification system(s) (100) may be used to collect and save data windows for multiple trials of multiple gestures performed by multiple users. An example data collection or training phase may include performing acts 201 and 202 of method 200 for multiple trials of multiple gestures performed by multiple users and saving the resulting data windows to a database. FIG. 4 provides an illustrative example of how such a database or collection of data windows may be used to define window classes.

FIG. 4 shows an exemplary collection of data points 401 (represented by solid black dots, only one called out in the Figure to reduce clutter) plotted in a two-dimensional space 400, where each data point 401 represents a respective data window collected and saved by a gesture identification system (100) during a data collection or training phase in accordance with the present systems, devices, and methods. A first dimension of space 400, represented by the x-axis in FIG. 4, corresponds to the voltage signal $V_1$ output by a first muscle activity sensor (110) of the gesture identification system (100). A second dimension of space 400, represented by the y-axis in FIG. 4, corresponds to the voltage signal $V_2$ output by a second muscle activity sensor (110) of the gesture identification system (100). Each data point 401 corresponds to a respective point in space 400 determined by the respective RMS values of the first and second voltage signals, $V_1$ and $V_2$, for a particular data window from a particular data collection trial. That is, each data point 401 in space 400 is of the form [$RMS_1(t_i)$, $RMS_2(t_i)$] for a given data collection trial, where $RMS_1(t_i)$ denotes the RMS value for the first voltage signal $V_1$ over time window $t_i$ and $RMS_2(t_i)$ denotes the RMS value for the second voltage signal $V_2$ over the same time window $t_i$.

In the illustrated example, the distribution of data points 401 is not uniform throughout space 400. There are regions of exemplary space 400 in which data points 401 are sparsely distributed and there are regions of exemplary space 400 in which data points 401 are densely clustered. Example regions 411, 412, 413, 414, 415, and 416 of space 400 in which data points 401 are particularly densely clustered are indicated by dashed rectangles. Each of regions 411, 412, 413, 414, 415, and 416 encompasses a respective group of data points 401 that all represent RMS values within a respective exclusive range. For example, region 414 exclusively encompasses all data points 401 (i.e., all data windows) for which the RMS value of the first voltage signal $V_1$ is in between A and B (i.e., $A<RMS_1(t_i)<B$) and the RMS value of the second voltage signal $V_2$ is in between C and D (i.e., $C<RMS_2(t_i)<D$). Rectangular regions 411, 412, 413, 414, 415, and 416 are used in FIG. 4 for illustrative purposes only and it should be understood that regions of any shape and/or size (including circular regions and/or irregularly shaped and/or polygonally shaped regions, any or all of which maybe convex or non-convex) may be used in any combination, depending on the specific implementation. As previously described, each region 411, 412, 413, 414, 415, and 416 corresponds to a respective "cluster" of data points 401 in space 400. In accordance with the present systems, devices, and methods, regions (or the centers of regions, depending on the algorithm) such as regions 411, 412, 413, 414, 415, and 416 may be determined, identified, and/or generated using one or more clustering technique(s), including but not limited to: k-means clustering, hierarchical clustering, and/or self-organizing map-based techniques.

Each of regions 411, 412, 413, 414, 415, and 416 in space 400 corresponds to a respective set of data windows having specific ranges of RMS values that occur with relatively high frequency and narrow variation. In accordance with the present systems, devices, and methods, each of regions 411, 412, 413, 414, 415, and 416 in space 400 may be defined as a respective window class in an implementation of method 200. For example, each of regions 411, 412, 413, 414, 415, and 416 of space 400 may directly map to a respective window class according to Table 1 below:

TABLE 1

Example definitions of window classes based on "cluster regions" of space 400

| Region of Space 400 | Window Class |
| --- | --- |
| 411 | A |
| 412 | B |
| 413 | C |
| 414 | D |
| 415 | E |
| 416 | F |
| *Anywhere else in space 400* | X |

To emphasize the analogy between "window classes" of a library of window classes and "letters" of an alphabet, each window class is represented by a respective letter (i.e., A, B, C, D, E, F, and X) in Table 1, although a person of skill in the art will appreciate that a window class may be represented by any name, number, symbol (collectively characters) or combination of characters depending on the implementation. In the example of Table 1, the library of window classes consists of window classes A, B, C, D, E, F, and X.

Returning again to act 203 of method 200, the processor (120) assigns a respective window class to each data window. Using the example of Table 1 (which is based on regions 411, 412, 413, 414, 415, and 416 identified in 2-dimensional space 400 of FIG. 4), the gesture identification system (100) may employ two sensors (110) and the processor (120) may assign a respective window class to each data window based on the particular region of space 400 into which each data window falls. Thus, at 203 the processor (120) assigns window class A to a data window if the data window falls into region 411 of space 400, window class B to a data window if the data window falls into region 412 of space 400, and so on. If a data window does not fall into any of the identified regions in space 400, then the processor (120) may not assign a window class to that data window or the processor (120) may assign a catch-all window class (X in Table 1) to that data window.

FIG. 4, Table 1, and the above example description of act 203 all use a 2-dimensional space 400 corresponding to a gesture identification system (100) having two sensors (110) solely for the purpose of simplifying illustration. In practice, a gesture identification system (100) may include any number N of sensors (110), where N≥1, and each window class in the library of window classes may exclusively characterize a respective region in an N-dimensional hyperspace, where each dimension of the N-dimensional hyperspace represents a property of the signal from a respective one of the N sensors (110). For example, the four signals 301, 302, 303, and 304 depicted in graph 300 of FIG. 3 may correspond to a 4-dimensional hyperspace (not illustrated but analogous to 2-dimensional space 400 from FIG. 4) where each dimension of the 4-dimensional hyperspace represents the voltage of a respective one of signals 301, 302, 303, and 304. To generalize the definitions of regions 411, 412, 413, 414, 415, and 416 in space 400, each region of an N-dimensional hyperspace may represent a respective combination of ranges for RMS values (calculated over the interval of each data window) of the signals from the N sensors. A person of skill in the art will appreciate, however, that in alternative implementations the number of dimensions may be less than or greater than the number of sensors (e.g., in implementations that use principal component analysis).

Throughout this specification and the appended claims, each window class in a library of window classes is often said to "exclusively characterize" at least one data window property. Generally, "exclusively characterizes" means that the window classes are defined/structured such that no data window can simultaneously satisfy the criteria of (i.e., be assigned or fall into) more than one window class. For example, regions 411, 412, 413, 414, 415, and 416 exclusively characterize data points 401 (per the mappings to window classes in Table 1) because there is no overlap between any of regions 411, 412, 413, 414, 415, and/or 416. In the example of space 400, it is clear that multiple regions may overlap for a single dimension (e.g., regions 413 and 414 overlap for a portion of the $V_1$ signal), but the area, volume, or N-dimensional space of any region may advantageously not overlap that of any other region.

In FIG. 4, each of regions 411, 412, 413, 414, 415, and 416 is defined by a respective combination of ranges for signal properties or parameter values (i.e., RMS values in the example). Each of regions 411, 412, 413, 414, 415, and 416 encompasses a respective cluster of data points 401 and, for that reason, regions 411, 412, 413, 414, 415, and 416 may be referred to as "cluster regions." In some implementations, satisfactory gesture identification may be achieved by mapping each cluster region (411, 412, 413, 414, 415, and 416) to a respective window class as in the example of Table 1. However, such a direct mapping does not take into account broad variations in signal amplitudes across different users. If, for example, muscle activity sensors (110), such as EMG sensors, are employed in the gesture identification system (100), then it is entirely possible for a first user to produce signals having an amplitude of around Z when the first user performs a gesture and for a second user to produce similar signals but having an amplitude of around 2Z, 3Z, 4Z, or so on (i.e., a scalar multiple of Z), when the second user performs the same gesture. Signal amplitudes may depend on a number of user-specific parameters such as overall strength, muscle mass, skin conductance, etc. An example of two similar signal configurations that differ primarily in their amplitude is seen with regions 412 and 413 in FIG. 4. The data points 401 in region 413 may be interpreted as a scalar multiple of the data points in region 412. In other words, for each data point 401 in region 413, the ratio of $RMS_1:RMS_2$ may be substantially similar to the ratio of $RMS_1:RMS_2$ for each data point 401 in region 412. In accordance with the present systems, devices, and methods, enhanced robustness against variations in use/user parameters may be achieved using window classes that correspond to ratios, angles, and/or ranges of angles (i.e., slices or "slice regions"), formed in the N-dimensional hyperspace that represents the sensor signals. A single window class may include multiple cluster regions in the N-dimensional hyperspace. As an example, angle $\theta_{420}$ in 2-dimensional space 400 defines a vector that passes through both regions 412 and 413, and a window class may be defined to include all data points 401 that fall within a certain proximity to the vector defined by angle $\theta_{420}$.

Angle $\theta_{420}$ is formed at the origin of space 400. Thus, as an alternative to mapping discrete cluster regions 411, 412, 413, 414, 415, and 416 to window classes as in the example of Table 1, space 400 may be divided into slices defined by ranges of angles at the origin and these slices may be mapped to window classes. An example is shown in Table 2 below, where angles are defined relative to the x-axis in the same way as illustrated for angle $\theta_{420}$ in FIG. 4:

TABLE 2

Example definitions of window classes based on "slice regions" of space 400

| Region/Slice of Space 400 | Window Class |
|---|---|
| 0°-5° | A |
| 7°-10° | B |
| 16°-24° | C |
| 35°-47° | D |
| 52°-53° | E |
| 67°-82° | F |
| *Anywhere else in space 400* | X |

Angle $\theta_{420}$ and the angles listed in Table 2 are all defined at the origin relative to the x-axis; however, in alternative implementations the angle(s) that define one or more slice region(s) in an N-dimensional hyperspace may be otherwise defined, including without limitation: relative to a different axis (i.e., not the x-axis) of the N-dimensional hyperspace, relative to a point, line, vector, plane, area, volume, or hyperplane of the N-dimensional hyperspace, and so on. Furthermore, a person of skill in the art will appreciate that an N-dimensional slice region may be defined or otherwise characterized by multiple angles and/or other boundaries in an N-dimensional hyperspace. Angle $\theta_{420}$ and the angles of Table 2 are defined in a 2-dimensional space (400) solely for ease of illustration. In general, the various embodiments described herein may employ window classes that exclusively characterize regions of an N-dimensional hyperspace, including without limitation: cluster regions; slice regions; regions bounded by points, lines, planes, hyperplanes, etc.; irregularly shaped regions; and any combination of the foregoing. In some implementations, multiple disparate regions in an N-dimensional hyperspace (e.g., cluster regions 411 and 415) may be mapped to the same window class.

At least some embodiments of the present systems, devices, and methods achieve enhanced robustness against variations in use/user parameters by, at least in part, using window classes that correspond to ratios, angles, and/or ranges of angles in an N-dimensional hyperspace in order to accommodate ranges of signal amplitudes that correspond to substantially the same signal configuration. This concept is similar to the teachings of U.S. Provisional Patent Application Ser. No. 61/915,338 (now U.S. Non-Provisional patent application Ser. No. 14/567,826), which is incorporated herein by reference in its entirety.

Returning to method 200 of FIG. 2, at 204 the processor (120) identifies the user-performed gesture based at least in part on the respective window classes of at least two data windows. The at least two data windows may include at least two successive/sequential data windows and/or at least two data windows among a larger set of more than two data windows (e.g., a second data window and a fourth data window in a set of five data windows).

In some implementations, the processor (120) may identify the user-performed gesture at 204 based, at least in part, on the relative probabilities that each gesture in a gesture library is the user-performed gesture. For example, method 200 may further include determining, by the processor (120), a respective probability P that each gesture in a gesture library is the user-performed gesture based on the respective window classes of at least two data windows. In this case, identifying the user-performed gesture by the processor (120) may include identifying, by the processor (120), a "highest-probability gesture" that corresponds to the gesture in the gesture library that has the highest probability (relative to the other gestures in the gesture library) of being the user-performed gesture.

In accordance with the present systems, devices, and methods, many different schemes, techniques, methods, formulae, calculations, algorithms, or most generally "approaches," may be employed to determine, by the processor (120), a respective probability that each gesture in a gesture library is the user-performed gesture based on the respective window classes of at least two data windows. As an example and again borrowing from established natural language processing techniques, the processor (120) may determine such probabilities based, at least in part, on at least one respective n-gram transition model for each gesture in the gesture library. Example n-gram transition models include, without limitation: a unigram transition model based on the window class of a single data window, a bigram transition model based on the respective window classes of two data windows, and/or a trigram transition model based on the respective window classes for three data windows. For a given gesture g in a gesture library, the unigram $P_g(A)$, defined in equation 1 below, gives the probability that window class A will occur among the data windows produced (e.g., at 202 of method 200) for that gesture g:

$$P_g(A) = \frac{\text{count}(A)}{\sum_{i=1}^{k} \text{count}(A_i)} \quad (1)$$

where $\sum_{i=1}^{k} \text{count}(A_i)$ sums over all of the window classes $A_i$ in the library of window classes. Similarly, the bigram $P_g(A_j|A_i)$, defined in equation 2 below, gives the probability that the sequence of window classes $A_i$, $A_j$ (where i≠j denotes the data window) will occur among the data windows produced (e.g., at 202 of method 200) for a given gesture g:

$$P_g(A_j | A_i) = \frac{\text{count}(A_j, A_i)}{\text{count}(A_i)} \quad (2)$$

In an exemplary implementation of the present systems, devices, and methods, for each gesture in a gesture library either the unigram, or the bigram, or both the unigram and bigram, may be used to determine the probability that the gesture is the user-performed gesture based on the respective window classes of at least two data windows. To illustrate, act 203 of method 200 may produce the following sequence of window classes (using the exemplary window classes from Table 1 or Table 2, with each window class in the sequence assigned to a respective data window per 203):

A A C A

Using this exemplary sequence of window classes, the unigram from equation 1 may be used to determine the probability that each gesture g in a gesture library is the user-performed gesture as follows:

$$P_{Uni}^g(AACA) = P_g(A) \cdot P_g(A) \cdot P_g(C) \cdot P_g(A) \quad (3)$$

For the same exemplary sequence of window classes, the bigram from equation 2 may be used to determine the probability that each gesture g in the gesture library is the user-performed gesture as follows:

$$P_{Bi}^g(AACA) \cong P_g(A) \cdot P_g(A|A) \cdot P_g(C|A) \cdot P_g(A|C) \quad (4)$$

Given the unigram $P_{Uni}^g(AACA)$ and the bigram $P_{Bi}^g(AACA)$ for the sequence of window classes AACA, the highest-probability gesture g* may be defined as, for example, the gesture in the gesture library that has either the maximum unigram, the maximum bigram, the maximum unigram or bigram, or the maximum value of an interpolation between the unigram and the bigram. An exemplary linear interpolation between the unigram and the bigram is given by equation 5:

$$P_{Inter}^g(AACA) = \alpha P_{Uni}^g(AACA) + (1-\alpha) P_{Bi}^g(AACA) \quad (5)$$

where α may be any number between 0 and 1.

Another example of a probability measure that may be used in the present systems, devices, and methods (e.g., either instead of or in addition to the n-gram transition model(s) described above) is based on the pairwise simultaneous occurrences of at least two window classes over a subset of data windows. For a given gesture g in a gesture library, the pairwise model $P_g(A_i \wedge A_j)$, defined in equation 6 below, gives the probability that window classes $A_i$ and $A_j$ will both occur (not necessarily in sequence) in a subset of data windows produced (e.g., at 202 of method 200) for that gesture g:

$$P_g(A_i \wedge A_j) = \frac{\sum_{m=1}^{N_g} \mathbb{1}_{g_m}(A_i, A_j)}{N_g} \quad (6)$$

where $N_g$ is the total number of data windows available, m is the number of data windows in the subset being examined, and $\mathbb{1}_{g_m}(A_i, A_j)$ is the indicator function that has a value of 1 if the data windows $A_i$ and $A_j$ are both present in the subset of m data windows.

Using the pairwise model from equation 6, the probability that a gesture g in a gesture library is the user-performed gesture for the exemplary sequence of window classes AACA may be determined using equation 7:

$$P_{Pair}^g(AACA) := P_g(A \wedge A) \cdot P_g(A \wedge C) \cdot P_g(C \wedge A) \quad (7)$$

In accordance with the present systems, devices, and methods, many different types of probability measures may be used to determine the respective probability that each gesture in a gesture library is the user-performed gesture and, furthermore, any number and/or combination of probability measures may be used to identify the highest-probability gesture. Generally, the highest-probability gesture g* may be defined, for the exemplary sequence of window classes AACA, by equation 8:

$$\operatorname*{argmax}_{g_i} P_x^{g_i}(AACA) \quad (8)$$

where $g_i$ tests each gesture in the gesture library and $P_x$ tests all of the different probability measures (e.g., unigram, bigram, linear interpolation, pairwise) explored in the implementation. For greater certainty, the pairwise model $P_g(A_i \wedge A_j)$ may be combined with one or more n-gram transition model(s) using an interpolation such as the linear interpolation of equation 5.

When the signals provided by sensors (110 and/or 140) in response to a user-performed gesture (e.g., per act 201 of method 200) are segmented or otherwise broken down into data windows (e.g., per act 202 of method 200), the highest probability gesture may be determined at each $i^{th}$ data window based on the particular combination, permutation, or sequence of window classes for the data windows leading up to and including the $i^{th}$ data window. In accordance with the present systems, devices, and methods, the user-performed gesture may ultimately be identified by the processor (120; per act 204 of method 200) based, at least in part, on repeat occurrences of the identification of the same gesture from the gesture library as the highest-probability gesture determined at multiple successive data windows. Table 3 below provides an illustrative example of this concept.

TABLE 3

Illustrative example of 3 repeat occurrences of "FIST" as the highest-probability gesture determined at multiple successive data windows

| Data Window | t1 | t2 | t3 | t4 | t5 | t6 | t7 |
|---|---|---|---|---|---|---|---|
| Window Class | A | A | C | A | B | F | C |
| Highest-P Gesture | — | FIST | POINT | FLICK | FIST | FIST | FIST |

The information in Table 3 is now summarized. Data/signals from one or more sensors (110 and/or 140) are segmented (per act 202 of method 200) into seven data windows t1, t2, t3, t4, t5, t6, and t7. This segmentation may occur in real-time as the datastream is continuously provided from the one or more sensors (110 and/or 140). While data window t2 is being provided by the sensor(s) (110 and/or 140), data window t1 is assigned (per act 203 of method 200) a window class A by the processor (120). When collection of data window t2 is completed, the processor (120) assigns (per act 203) window class A to data window t2. With at least two data windows (i.e., t1 and t2) now having been collected, the processor (120) determines the respective probability that each gesture in a gesture library is the user-performed gesture based on the data window sequence AA and identifies FIST as the highest-probability gesture. Data window t3 is then examined by the processor (120) and assigned (per act 203) window class C. Based on the sequence of window classes AAC up to and including data window t3, the processor (120) determines that the highest-probability gesture is POINT. The processor (120) then assigns (per act 203) window class A to data window t4 and determines that the highest-probability gesture for the sequence of window classes AACA is FLICK. Moving on to data windows t5, t6, and t7, the processor (120) assigns (per act 203) window classes B, F, and C, respectively, and identifies the highest-probability gesture for the sequence AACAB as FIST, for the sequence AACABF as FIST, and for the sequence AACABFC as FIST. With three successive determinations of FIST as the gesture having the highest probability of being the user-performed gesture, the processor (120) returns FIST as the identity of the user-performed gesture. At this point, the user may or may not have completed performing their FIST gesture. For example, the FIST gesture may have spanned seven data windows, or the FIST gesture may span more than seven data windows but the processor may have identified the gesture as FIST without needing to process more than seven data windows.

In accordance with the present systems, devices, and methods, the final determination/identification of the user-performed gesture by the processor (120) may be established in a variety of different ways depending on the particular implementation. In the illustrative example of Table 3, a prescribed number X of repeat determinations of the same gesture from the gesture library as the highest-probability gesture for multiple successive data windows is used as an exit criterion that must be satisfied before the processor (120) ultimately identifies/determines the user-performed gesture. In the example of Table 3, X=3 and the criterion is met over successive data windows t5, t6, and t7; however, in alternative embodiments X may be any number greater than or equal to 1, such as for example X=5. Furthermore, while the X criterion used in Table 3 requires repeat successive determinations of the same gesture as the highest-probability gesture, in alternative implementations an exit criterion may specify a number of repeat determinations of the same gesture as the highest-probability gesture without requiring that the repeat determinations be successive. For example, some implementations may require that the same gesture be identified as the highest-probability gesture Y times, but the Y occurrences may be distributed among any number of data windows in any order, combination, or permutation (e.g., Y=4, with a first occurrence in data window t2, a second occurrence in data window t5, a third occurrence in data window t6, and a fourth occurrence in data window t10), though in practice an upper bound on the number of data windows examined is often appropriate.

Some implementations make take the number of data windows into account during the gesture identification process. For example, the X and/or Y thresholds specified above may evolve (e.g., to provide an at least approximately fixed percentage W=X/N, where N is the current number of data windows) depending on the number of data windows being examined, or an exit criterion may include returning the gesture that has been identified most frequently as the highest-probability gesture after Z data windows. Some implementations may simply use a threshold probability P* for the highest-probability gesture, and return the current highest-probability gesture as the user-performed gesture if the probability of the highest-probability gesture being the user-performed gesture is greater than or equal to P*.

In some implementations, the number of data windows being analyzed may continue to grow, one at a time, with each successive data window (e.g., first just t1, then {t1, t2}, then {t1, t2, t3}, . . . , then {t1, t2, . . . , tn}, and so on). In other implementations, the number of data windows being examined may be capped at a predefined number C. In this latter scenario, the number of data windows being analyzed may increase one at a time until the cap C is reached, and then each new data window may replace a previous data window. For example, with the cap C=3, first data window t1 may be analyzed, then {t1, t2}, then {t1, t2, t3}, and thereafter with each new data window added a previous data window may be left off. In this way, after {t1, t2, t3}, t4 is added to the analysis and t1 is removed to produce {t2, t3, t4}, then {t3, t4, t5}, then {t5, t6, t7}, and so on. In different implementations, a cap C, if applied at all, may take on a variety of different numbers, such as 2, 3, 4, 5, 6, etc.

As previously described, a gesture identification system (100) may include a non-transitory processor-readable storage medium or memory (130) that is communicatively coupled to the processor (120), where the memory (130) may store a set of processor-executable gesture identification instructions (131) that, when executed by the processor (120), cause the processor (120) to, at least, assign a respective window class to each data window per act 203 of method 200 and identify the user-performed gesture based at least in part on the respective window classes of at least two data windows per act 204 of method 200. The processor-executable gesture identification instructions (131) may include instructions that, when executed by the processor (120), cause the processor (120) to determine a respective probability that each gesture in a gesture library is the user-performed gesture using, for example, the probability schemes of equations 1 through 8 described previously. The memory (130) may store the library of window classes from which individual window classes are selected and assigned to data windows at act 203 of method 200 and/or the memory (130) may store the gesture library from which the user-performed gesture is selected by the processor (120) based on the respective window classes of at least two data windows per act 204 of method 200. In some implementations, the processor-executable gesture identification instructions (131) may, when executed by the processor (120), cause the processor (120) to segment the at least one signal provided from the at least one sensor (110 and/or 140) into discrete data windows per act 202 of method 200.

In the various implementations described herein, at least some of the acts performed by the processor (120) of a gesture identification system (100) may be carried out substantially continuously and/or at least some of the acts performed by the processor (120) of a gesture identification system (100) may be carried out in an "as needed" or "on call" fashion. Limiting some acts to being performed only "as needed" or "on call" may conserve battery (160) power in a wearable gesture identification device (100). As an example, acts 201 and 202 of method 200 may be performed or carried out substantially continuously and/or at all times while device 100 in powered on and in use by a user, while act 203 (and consequently act 204) may only be performed or carried out in response to the user performing a physical gesture. To this , method 200 may further include detecting initiation of the user-performed gesture by the processor (120) based on at least one property of at least one data window. This may include detecting, by the processor (120), initiation of the user-performed gesture based on at least one RMS value for at least one data window. While a user is wearing a wearable electronic component of a gesture identification system (100), signals continuously provided by the sensors (110 and/or 140) may typically have low RMS values if the user is not performing a physical gesture. Initiation of a user-performed gesture may be detected as a spike in the RMS value(s) of one or more data window(s) corresponding to an increase in activity of whatever form to which the sensor(s) (110 and/or 140) is/are designed to respond (i.e., to detect, sense, measure, or transduce). For example, a spike in the RMS value from an EMG sensor (110) may indicate initiation of a muscle activity component of a user-performed gesture. In some implementations, an activation threshold may be defined and acts 203 and 204 of method 200 may only be carried out by the processor (120) in response to the RMS value of at least one data window exceeding the activation threshold.

As will be clear to a person of skill in the art based on the description of method 200, the various embodiments described herein include iterative methods for performing automated gesture identification in real-time, with each iteration corresponding to a respective data window from the data stream(s) provided by sensor(s) (110 and/or 140) of a wearable gesture identification device (100). This concept is illustrated in FIG. 5.

Figure 5:
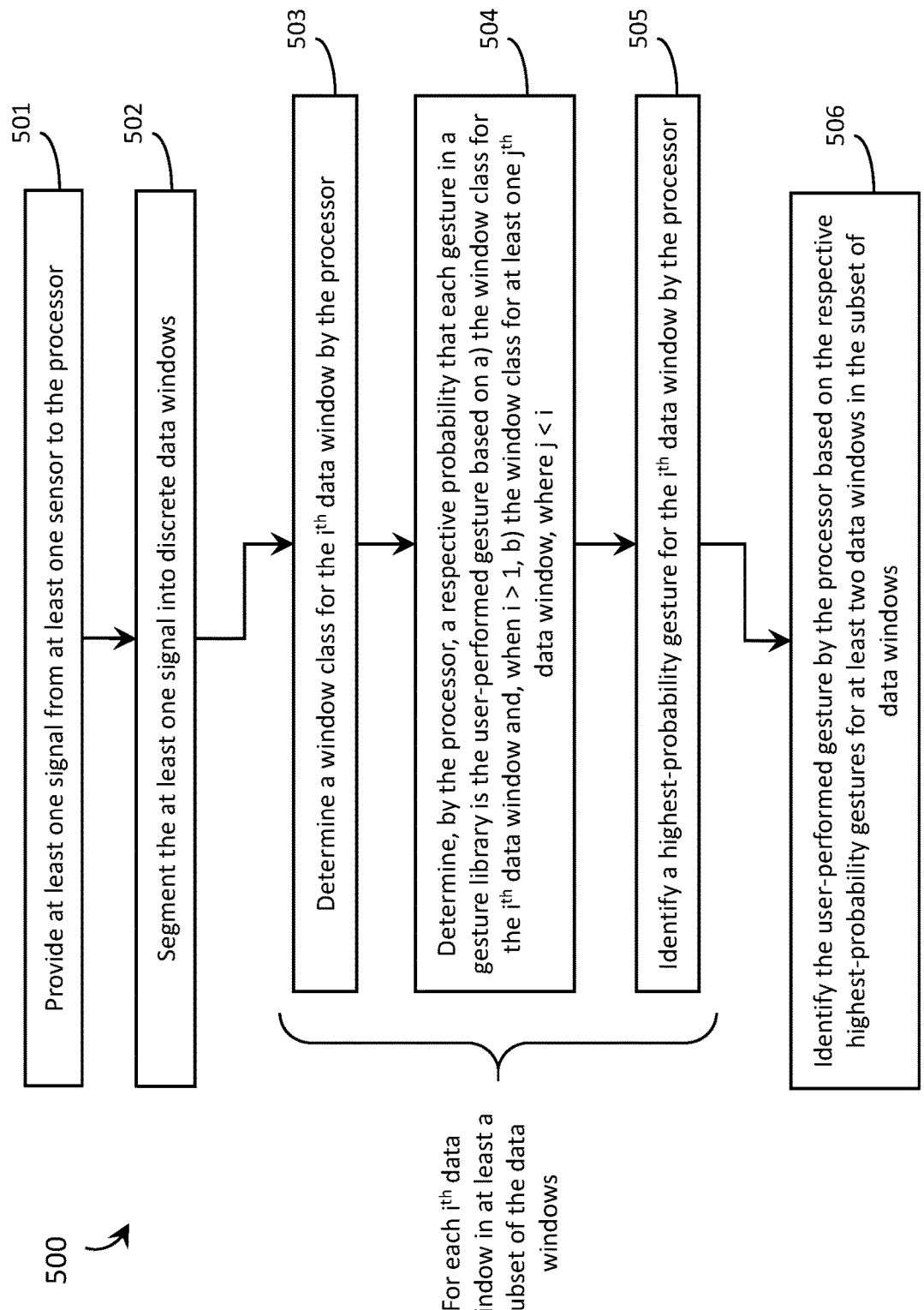
FIG. 5 is a flow-diagram showing a method of operating a gesture identification system to identify a user-performed gesture in accordance with the present systems, devices, and methods.

FIG. 5 is a flow-diagram showing a method 500 of operating a gesture identification system (100) to identify a user-performed gesture in accordance with the present systems, devices, and methods. The gesture identification system (100) includes at least one sensor (110 and/or 140) and a processor (120) and may form part of a human-electronics interface in which the gesture identification system (100) is used to provide gesture-based interaction with and/or control of another electronic device.

Method 500 includes six acts 501, 502, 503, 504, 505, and 506, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments. Method 500 is substantially similar to method 200 from FIG. 2 but provides some additional details on the iterative processing of individual data windows.

Acts 501 and 502 of method 500 are substantially similar to acts 201 and 202 of method 200, respectively. At 501 at least one signal (e.g., at least one electrical signal) is provided from at least one sensor (110 and/or 140) of the gesture identification system (100) to the processor (120), and at 502 the at least one signal is segmented into discrete data windows. Acts 503, 504, and 505 of method 500 then detail the iterative processing of individual data windows. As indicated in FIG. 5, each of acts 503, 504, 505 is carried out "for each $i^{th}$ data window in at least a subset of the data windows." Here, i is used as an index, where i=1 for the first iteration and i is increased by an increment of 1 for each successive iteration (i.e., i=2 for the second iteration, i=3 for the third iteration, and so on). The at least a subset of the data windows for which acts 503, 504, and 505 are carried out may include all of the data windows, or may include, for example, only those data windows that have or closely follow a data window that has (e.g., immediately follow, or follow within a prescribed number of data windows such as about two, three, four, or five data windows) an RMS value that exceeds an activation threshold.

At 503, the processor (120) determines (e.g., assigns) a window class for the $i^{th}$ data window. The window class may be selected by the processor (120) from a library of window classes in a substantially similar way to that described for act 203 of method 200. As previously described, each window class exclusively characterizes at least one data window property (e.g., RMS value, region/angle in an N-dimensional hyperspace, etc.).

At 504, the processor (120) determines a respective probability that each gesture in a gesture library is the user-performed gesture based on:
a) the window class for the $i^{th}$ data window (i.e., the current data window in the iteration cycle), and
b) when i>1 (i.e., for all data windows except the first data window in the iteration cycle), the window class for at least one $j^{th}$ data window, where j<i.

In other words, at 504 the processor (120) determines a respective probability that each gesture in a gesture library is the user-performed gesture based on the window class of the current $i^{th}$ data window in the iteration cycle and (if the current data window is not the first data window in the iteration cycle) on the respective window classes of one or more previous $j^{th}$ data window(s) (j<i) in the iteration cycle. In some implementations, multiple different $j^{th}$ data windows (e.g., j=1, 3, and 7, where i>7) may be included in the determination of the respective probabilities, whereas in other implementations a single $j^{th}$ data window may be used, such as j=(i−1) (i.e., the immediately previous data window) or any j<(i−1). The respective probabilities may be determined using a wide range of methods, including but not limited to n-gram transition models and/or pairwise occurrences as outlined previously in equations 1 through 8. For n-gram transition models, a unigram transition model (equations 1 and 3) may be based on the window class of the $i^{th}$ data window (i.e., the current data window in the iteration cycle) and a bigram transition model (equations 2 and 4) may be based on the respective window classes of the $i^{th}$ data window and the $j^{th}$=(i−1)$^{th}$ data window (i.e., the previous data window in the iteration cycle).

At 505, the processor (120) identifies a highest-probability gesture for the $i^{th}$ data window in a substantially similar way to that described for method 200. The highest-probability gesture may be defined by, for example, equation 8. After the highest-probability gesture is identified by the processor (120) for the $i^{th}$ data window, method 500 may return to act 503 and repeat acts 503, 504, and 505 for another data window (e.g., for the (i+1)$^{th}$ data window).

A series of iterations of acts 503, 504, and 505 (i.e., for a series of $i^{th}$ data windows: i, (i+1), (i+2), etc.) produces a series of identifications of the highest-probability gesture, with each identification of the highest-probability gesture corresponding to a respective one of the data windows. Returning to the illustrative example of Table 3, a first iteration of acts 503, 504, and 505 for a first data window i=1=t1 may return an inconclusive result for the highest-probability gesture (because, for example, t1 is the first data window and the probability formulae of equations 2 through 8 generally require at least two data windows), a second iteration of acts 503, 504, and 505 for a second data window i=2=t2 may return FIST as the highest-probability gesture, and so on. In accordance with the present systems, devices, and methods, the iteration cycle of acts 503, 504, and 505 may continue indefinitely or may terminate in response to a range of different criteria and/or conditions. For example, the iteration cycle of acts 503, 504, and 505 may continue even when method 500 proceeds to act 506, or the iteration cycle of acts 503, 504, and 505 may terminate in response to method 500 proceeding to act 506.

At 506, the processor (120) identifies the user-performed gesture based on the respective highest-probability gestures for at least two data windows (i.e., i and j, where i≠j) in the subset of data windows. In the illustrative example of Table 3, at 506 the processor (120) may return FIST as the user-performed gesture at data window i=6=t6 or i=7=t7 (depending on the implementation) because for both of those data windows the highest-probability gesture identified at 505 is a repeat occurrence of the same highest-probability gesture identified at 505 for the previous data window. As described previously, some implementations may identify the user-performed gesture at 506 based on X repeat occurrences of the same highest-probability gesture for X successive data windows (where X≥2), or Y repeat occurrences of the same highest-probability gesture distributed across Q data windows (where Q>Y), or based on a wide range of other potential conditions/criteria.

As previously described, a gesture identification system (100) may include a non-transitory processor-readable storage medium or memory (130) that is communicatively coupled to the processor (120), and the memory (130) may store processor-executable gesture identification instructions (131). In use, executing the gesture identification instructions (131) may cause the processor (120) to perform at least acts 503, 504, 505, and 506 of method 500. More specifically, the processor (120) may execute the gesture identification instructions (131) to cause the processor (120) to: determine the window class for each $i^{th}$ data window (per act 503), determine the respective probability that each gesture in the gesture library is the user-performed gesture for each $i^{th}$ data window (per act 504), identify the highest-probability gesture for each $i^{th}$ data window (per act 505), and identify the user-performed gesture based on the respective highest-probability gestures of at least two data windows (per act 506).

The ability of the gesture identification systems, devices (100), and methods described herein to accurately identify gestures may benefit, in some implementations, from specific information about at least some use parameters. For example, in order for a wearable gesture identification device (100) to perform accurate gesture identification as described herein, the algorithm(s) employed by the wearable device (100) may depend on and/or be influenced by the location, position, and/or orientation of the device's sensors (110 and/or 140) in relation to the body of the user. In accordance with the present systems, devices, and methods, all of the necessary information about the location, position, and/or orientation of the sensors (110 and/or 140) may be readily collected by the wearable device (100) by having the user perform a single reference gesture when the wearable device (100) is first donned. Such is a considerable improvement over the elaborate training procedures (requiring the user to perform a series of multiple trials for each of multiple gestures) required by known proposals for wearable devices that perform gesture identification.

A user may be instructed to don a wearable device (100) on, for example, one of their forearms with any orientation and at any location above the wrist and below the elbow that provides a comfortable, snug fit (although if muscle activity sensors are employed then best performance may be achieved with the device located proximate the most muscular part of the forearm, i.e., just below the elbow). A feature of exemplary wearable device 100 from FIG. 1 is that the order of the muscle activity sensors 110 around the perimeter of the device 100 is fixed. That is, each sensor 110 is positioned adjacent and in between the same two other sensors 110 regardless of the position and/or orientation of the device 100. Furthermore, the angular spacing between sensors 110 remains substantially constant as described in U.S. Non-Provisional patent application Ser. No. 14/276,575 (now US Patent Publication 2014-0334083). Thus, assuming the device 100 is snugly fit on the forearm of the user, in order to determine the position and/or orientation of the muscle activity sensors 110 on the forearm of the user, only three things need to be determined by the wearable device 100: i) on which arm of the user is the device 100 being worn, ii) what is the rotational orientation of the device 100; and iii) what is the front-to-back orientation of the device 100? In accordance with the present systems, devices, and methods, having the user perform a single reference gesture can provide all of the information necessary to answer each of these three questions. The process of determining the arm, rotational orientation, and positional orientation of a wearable device (100) is referred to herein as "calibration."

As an example, calibration may be done by:
 i) storing (e.g., in the on-board memory (130) of the wearable device (100)) a set of reference gesture templates in a "reference gesture library," where each reference gesture template corresponds to the same reference gesture but for different positions and/or orientations of the wearable device (100);
 ii) executing either of methods 200 and/or 500 using the reference gesture library instead of the regular "gesture library"; and
 iii) when a particular reference gesture template is identified as the user-performed gesture, using the configuration of the axes of the N-dimensional hyperspace for the particular reference gesture template to calibrate the configuration of the axes of the N-dimensional hyperspace for the gestures in the gesture library (i.e., the gestures/gesture library discussed in the descriptions of methods 200 and 500). This may be done by, e.g., matching the configuration of the axes of the N-dimensional hyperspace for the gestures of the gesture library to the configuration of the axes of the N-dimensional hyperspace for the particular reference gesture template.

As an alternative example, only one reference gesture template may be stored in the memory (130) of the wearable device (100), and when the user performs the reference gesture the configuration of the axes of the N-dimensional hyperspace in which the reference gesture template is defined may be varied until the reference gesture template best matches the incoming data representing the user's performance of the reference gesture. The configuration of the axes of the N-dimensional hyperspace in which the reference gesture template is defined that enables the reference gesture template to best match the incoming data from the user's performance of the reference gesture may then be used to calibrate the configuration of the axes of the N-dimensional hyperspace in which the gestures of the gesture library are defined (e.g., by matching the configuration of the axes of the N-dimensional hyperspace in which the gestures of the gesture library are defined to the configuration of the axes of the N-dimensional hyperspace for which the reference gesture template best matches the incoming data).

While many different gestures may be used as a reference gesture, an example of a suitable reference gesture is: begin with the arm (i.e., the arm upon which the device is worn) bent about 90 degrees at the elbow such that the upper arm (i.e., above the elbow) hangs loosely downwards from the shoulder and the lower arm (i.e., below the elbow) extends outwards in front of the user with the hand/fingers relaxed, the wrist straight, and the hand on its side with the palm facing inwards, then bend the wrist outwards such that the open palm faces forwards and extend the fingers (without deliberately splaying the fingers) to point outwards approaching ninety degrees to the forearm (i.e., as far past about thirty or forty-five degrees as is comfortable for the user) while calmly swiping the arm (rotating at the elbow) outwards away from the body.

As described above, a user may calibrate a wearable device (100) in accordance with the present systems, devices, and methods by performing only a single reference gesture. In some applications, no further training procedures may be required before the device can begin identifying gestures performed by the user.

In accordance with the present systems, devices, and methods, changes in the position and/or orientation of the wearable device (100) may produce changes (e.g., shifts, rotations, etc.) in the resulting signals provided by the sensors (110 and/or 140) when the user performs a physical gesture. An initial reference gesture as described herein is used to determine the "orientation" of the sensor signals. If the rotational orientation of device 100 is varied by, for example, 180 degrees, then the corresponding sensor signals may also be "rotationally reoriented" by 180 degrees. If the front-to-back orientation of device 100 is also varied, then the corresponding sensor signals may also be "front-to-back reoriented." In either case (or in both cases), the gestures in the gesture library may be recalibrated to reflect the position and/or orientation of device 100 on the user's forearm based on the reference gesture.

The position and/or orientation of the wearable device (100) may change during use (e.g., during an extended session of continuous use, such as continuous use for on the order of hours, or from a physical bump or displacement). Accordingly, the various embodiments described herein may include monitoring a quality of match between the signal data provided by the sensors (110 and/or 140) and the gesture identified based on that signal data. In such implementations, the wearable device (100) may include processor-executable instructions stored in a non-transitory processor-readable storage medium (130) that, when executed by the processor (120) of the wearable device (100), cause the processor (120) to monitor a quality of match between the signal data provided by the sensors (110 and/or 140) and the gesture identified based on that signal data. If the quality of match shows signs of degradation (or, for example, the wearable device (100) is unable to recognize a gesture performed by the user after one or more attempts) then the wearable device (100) may be configured to prompt the user to perform or repeat the reference gesture. The wearable device (100) may prompt the user to perform or repeat the reference gesture by, for example, illuminating or flashing a corresponding light emitting diode (LED) or other visual indicator, by activating a vibratory motor or other actuator providing haptic or tactile feedback to the user, or through software on a separate device in communication with the wearable device (100), and so on. Alternatively, the user may identify degradation in the accuracy of gesture identification and volunteer to perform or repeat the reference gesture. The user may signify an intent to perform or repeat the reference gesture by, for example, toggling a switch or button on the wearable device (100), or by performing an unambiguously identifiable gesture such as tapping/smacking the wearable device (100) multiple times in quick succession (which is clearly detected by an inertial sensor (140)), etc. The wearable device (100) may be configured to sense when it has been removed by the user (e.g., by sensing an extended period of no inertial sensor (140) activity, or by identifying erratic signals that may be produced by muscle activity sensors (110) as they are decoupled from and/or when they are no longer coupled to the user's body) and to expect a reference gesture when it is put back on by a user. In some implementations, the wearable device (100) may detect, based on corresponding sensor signal data, "motion artifacts" corresponding to friction of one or more sensor electrode(s) over the user's skin. Such motion artifacts may produce characteristic signal data and when the wearable device (100) identifies such data the wearable device (100) may recognize that its position and/or orientation has changed relative to the skin of the user and therefore prompt the user to perform the reference gesture again.

In accordance with the present systems, devices, and methods, a reference gesture used for calibration purposes may (or may not) be distinct from the gestures in the gesture library that a wearable device is operative to identify. When the reference gesture is distinct from the gestures of the gesture library that the device is operative to identify, such is distinct from conventional calibration methods in which initial instances of specific quantities are typically captured and used to qualify subsequent instances of the same quantities, and advantageous in that a single reference gesture is used to calibrate the device for all gestures in the gesture library.

In the preceding examples, calibration of a wearable gesture identification device is used as an example of calibration of any gesture identification system. A person of skill in the art will appreciate that the calibration process(es) described above may similarly be implemented by a gesture identification system in which the sensor(s) is/are carried by one or more separate wearable electronic device(s) and the sensor signals are processed by a processor located off of the wearable electronic device(s).

Various embodiments of the present systems, devices, and methods are described as potentially (e.g., optionally) employing at least one activation threshold. As an example, acts 201 and 202 of method 200 (and similarly acts 501 and 502 of method 500) may be repeatedly or continuously performed by the gesture identification system (100) whenever the system (100) is powered on (and/or in an "active" state). However, acts 203 and 204 of method 200 (and similarly acts 503, 504, 505, and 506 of method 500) may only be triggered/completed/performed when at least one signal in the set of signals provided at act 201 (or similarly 501) exceeds a threshold. In the exemplary case of an activation threshold based on one or more RMS value(s), an RMS baseline value of each signal channel in its "rest" or "quiescent" state (i.e., when there is no activity detected) may first be determined and then further acts (e.g., 203 and 204, or 503, 504, 505, and 506) may only be triggered/completed/performed when at least one RMS value of at least one data window exceeds the corresponding "rest" or "quiescent" state for that signal channel by a defined percentage, such as by 50%, by 100%, by 150%, etc. In this case, the activation threshold is represented as the percentage (%) above the "rest" or "quiescent" state that an RMS value must reach. However, a "rest" or "quiescent" state RMS value may be zero, so a person of skill in the art will appreciate that other threshold schemes may be preferred, including but not limited to: a defined percentage (%) of the mean RMS value for the signal channel, a defined percentage (%) of the maximum RMS value for the signal channel, a fixed minimum RMS value, and so on. In some implementations, the definition of the activation threshold may adjust to accommodate new data (e.g., the mean RMS value for each signal channel may be continuously, repeatedly or periodically monitored and updated when applying an activation threshold based on the mean RMS value for each signal channel). In order to limit the number of "false positives," it may be advantageous to implement multiple activation thresholds that must be exceeded substantially simultaneously (and/or a single activation threshold that must be exceeded by multiple values substantially simultaneously) by multiple sensor signal channels and/or at least one activation threshold that must be exceeded by multiple successive data windows.

In accordance with the present systems, devices, and methods, a user's reference gesture may be used to establish at least one activation threshold and/or to normalize signals for that particular user. The reference gesture may be, for example, deliberately selected to involve a Maximum Voluntary Contraction, or MVC, of the user (the exemplary reference gesture described herein is an example of this, where the outward extension of the fingers and bending back of the wrist reaches a maximum point of mobility for most users) and/or the user may be, for example, instructed to perform the reference gesture with particular vigor. In either case, the reference gesture may provide reference values (for example, maximum RMS values, or ratios of maximum RMS values) that may be used by the processor (120) to set activation thresholds and/or to normalize signals provided by the sensors (110 and/or 140) for the specific user.

While the various embodiments described herein provide systems, devices, and methods of gesture identification, in some applications it is also important to identify when a user has stopped performing (i.e., "released") a gesture. For example, in an application in which the performance of a gesture effects and action and that action is maintained throughout the performance of the gesture, it can be important to identify when the user has stopped performing the gesture in order to stop effecting the controlled action. The present systems, devices, and methods may identify when a user has stopped performing a gesture based on, for example, all signal channels falling below the activation threshold, or the ongoing sequence of window classes ceasing to correspond to the identified gesture.

The signals that are detected and provided by the sensors (110 and/or 140) of a gesture identification system (100) when a user performs a gesture may not be identical each time the same gesture is performed, even by the same user. Discrepancies between different instances of the same gesture may result from variations in many different use parameters, including but not limited to: signal noise, discrepancies in how the gesture is performed, shifts or variations in the orientation and/or position of a wearable device (100) during or between gestures, a different user performing the same gesture, muscle fatigue, a change in environmental or skin conditions, etc. The various embodiments described herein provide systems, devices, and methods for operating a gesture identification system (100) to identify a gesture (or gestures) performed by a user with improved robustness against such variations in use parameters. Improved robustness is achieved, at least in part, by segmenting sensor data into discrete data windows, assigning a respective "window class" to each data window, and identifying the user-performed gesture based on the resulting sequence of window classes. Furthermore, the data stored and processed in the various embodiments described herein is relatively small (in terms of system memory required for storage) and the calculations and other acts involved in processing said data can readily be executed by a relatively low-power, low-performance processor.

The various embodiments described herein may be implemented as an alternative to, or in combination with, the system, articles, and methods for gesture identification described in U.S. Provisional Patent Application Ser. No. 61/881,064 (now US Patent Publication 2015-0084860) and/or U.S. Provisional Patent Application Ser. No. 61/894,263 (now US Patent Publication 2015-0109202), both of which are incorporated by reference herein in their entirety.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to: U.S. Non-Provisional patent application Ser. No. 14/737,081; U.S. Provisional Patent Application Ser. No. 62/014,605; U.S. Non-Provisional patent application Ser. No. 14/186,878 (now US Patent Publication 2014-0240223); U.S. Non-Provisional patent application Ser. No. 14/186,889 (now US Patent Publication 2014-0240103); U.S. Non-Provisional patent application Ser. No. 14/276,575 (now US Patent Publication 2014-0334083); U.S. Provisional Patent Application Ser. No. 61/869,526 (now US Patent Publication 2015-0057770); U.S. Provisional Application Ser. No. 61/881,064 (now US Patent Publication 2015-0084860); U.S. Provisional Application Ser. No. 61/894,263 (now US Patent Publication 2015-0109202); U.S. Provisional Patent Application Ser. No. 61/909,786 (now U.S. Non-Provisional patent application Ser. No. 14/553,657); U.S. Provisional Patent Application Ser. No. 61/915,338 (now U.S. Non-Provisional patent application Ser. No. 14/567,826); U.S. Provisional Patent Applications Ser. No. 61/940,048 (now U.S. Non-Provisional patent application Ser. No. 14/621,044); and U.S. Provisional Patent Application Ser. No. 61/971,346 (now U.S. Non-Provisional patent application Ser. No. 14/669,878); are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operating a gesture identification system to identify a user-performed gesture, the gesture identification system including at least one sensor responsive to user-performed gestures and a processor communicatively coupled to the at least one sensor, the method comprising:
providing at least one signal from the at least one sensor to the processor;
segmenting the at least one signal into data windows;
for each $i^{th}$ data window in at least a subset of the data windows:
determining a window class for the $i^{th}$ data window by the processor, the window class selected by the processor from a library of window classes, wherein each window class in the library of window classes exclusively characterizes at least one data window property;
determining, by the processor, a respective probability that each gesture in a gesture library is the user-performed gesture based on the window class for the $i^{th}$ data window, wherein determining, by the processor, a respective probability that each gesture in a gesture library is the user-performed gesture includes:
determining, by the processor, at least one respective transition model for each gesture in the gesture library; and
determining, by the processor and for each gesture in the gesture library, a probability that the gesture is the user-performed gesture based at least in part on the at least one transition model for the gesture; and
identifying a highest-probability gesture for the $i^{th}$ data window by the processor, the highest-probability gesture corresponding to the gesture in the gesture library that has a highest probability of being the user-performed gesture for the $i^{th}$ data window; and
identifying the user-performed gesture by the processor based on the highest-probability gesture for at least one data window in the at least a subset of data windows.

2. The method of claim 1 wherein providing at least one signal from the at least one sensor to the processor includes providing at least one substantially continuous data stream from the at least one sensor to the processor, and wherein segmenting the at least one signal into data windows includes segmenting the at least one substantially continuous data stream into data windows in real-time by the processor.

3. The method of claim 1 wherein each window class in the library of window classes exclusively characterizes a respective range of values for the same at least one data window property.

4. The method of claim 3 wherein each window class in the library of window classes exclusively characterizes a respective range of values for at least one Root Mean Square ("RMS") value for the $i^{th}$ data window.

5. The method of claim 1 wherein the at least one sensor includes a plurality of sensors, and wherein:
providing at least one signal from the at least one sensor to the processor includes providing a respective signal from each respective sensor in the plurality of sensors to the processor; and
segmenting the at least one signal into data windows includes segmenting the respective signal from each respective sensor in the plurality of sensors into the data windows, wherein each data window includes a respective portion of the signal from each respective sensor in the plurality of sensors.

6. The method of claim 5 wherein the plurality of sensors includes N sensors, and wherein each window class in the library of window classes exclusively characterizes a respective region in an N-dimensional hyperspace and each dimension of the N-dimensional hyperspace represents a property of the signal from a respective one of the N sensors.

7. The method of claim 6 wherein each region of the N-dimensional hyperspace represents a respective combination of ranges for Root Mean Square ("RMS") values of the signals from the N sensors.

8. The method of claim 6 wherein, for each window class in the library of window classes, the corresponding region in the N-dimensional hyperspace is exclusively characterized by at least one respective angle formed in the N-dimensional hyperspace.

9. The method of claim 1 wherein the at least one sensor includes at least one muscle activity sensor selected from the group consisting of: an electromyography (EMG) sensor and a mechanomyography (MMG) sensor, and wherein:
providing at least one signal from the at least one sensor to the processor includes providing at least one signal from the at least one muscle activity sensor to the processor.

10. The method of claim 1 wherein the at least one sensor includes at least one inertial sensor selected from the group consisting of: an accelerometer, a gyroscope, and an inertial measurement unit (IMU), and wherein:

providing at least one signal from the at least one sensor to the processor includes providing at least one signal from the at least one inertial sensor to the processor.

11. The method of claim 1 wherein the gesture identification system further comprises a non-transitory processor-readable storage medium that stores processor-executable gesture identification instructions, the non-transitory processor-readable storage medium communicatively coupled to the processor, and the method further comprising: executing by the processor the gesture identification instructions to cause the processor to:
   determine the window class for each $i^{th}$ data window;
   determine the respective probability that each gesture in the gesture library is the user-performed gesture for each $i^{th}$ data window;
   identify the highest-probability gesture for each $i^{th}$ data window; and
   identify the user-performed gesture.

12. A gesture identification system comprising:
   at least one sensor responsive to physical gestures performed by a user of the gesture identification system, wherein in response to a physical gesture performed by the user the at least one sensor provides at least one signal;
   a processor communicatively coupled to the at least one sensor; and
   a non-transitory processor-readable storage medium communicatively coupled to the processor, wherein the non-transitory processor-readable storage medium stores processor-executable gesture identification instructions that, when executed by the processor, cause the gesture identification device to:
   segment the at least one signal into data windows;
   for each $i^{th}$ data window in at least a subset of the data windows:
      determine a window class for the $i^{th}$ data window, the window class selected from a library of window classes, wherein each window class in the library of window classes exclusively characterizes at least one data window property;
      determine a respective probability that each gesture in a gesture library is the physical gesture performed by the user based on the window class for the $i^{th}$ data window, wherein the processor-executable gesture identification instructions that, when executed by the processor, cause the gesture identification device to determine a respective probability that each gesture in a gesture library is the physical gesture performed by the user, cause the gesture identification device to:
         determine at least one respective transition model for each gesture in the gesture library; and
         determine, for each gesture in the gesture library, a probability that the gesture is the physical gesture performed by the user based at least in part on the at least one transition model for the gesture; and
      identify a highest-probability gesture for the $i^{th}$ data window, the highest-probability gesture corresponding to the gesture in the gesture library that has a highest probability of being the physical gesture performed by the user for the $i^{th}$ data window; and
   identify the physical gesture performed by the user based on the highest-probability gesture for at least one data window in the at least a subset of data windows.

13. The gesture identification system of claim 12 wherein the at least one sensor includes a sensor selected from the group consisting of: a muscle activity sensor, an electromyography (EMG) sensor, a mechanomyography (MMG) sensor, an inertial sensor, an accelerometer, a gyroscope, an inertial measurement unit (IMU), a photosensor, an optical sensor, and an infrared sensor.

14. The gesture identification system of claim 12, further comprising: a wearable gesture identification device comprising a band that in use is worn on a limb of the user, wherein the at least one sensor, the processor, and the non-transitory processor-readable storage medium are all carried by the band.

15. The gesture identification system of claim 12 wherein each window class in the library of window classes exclusively characterizes a respective range of values for the same at least one data window property.

16. The gesture identification system of claim 12 wherein the at least one sensor includes a plurality of sensors, each of which is responsive to physical gestures performed by the user, and wherein the processor-executable gesture identification instructions, when executed by the processor, cause the gesture identification device to:
   segment the respective signal from each respective sensor in the plurality of sensors into the data windows, wherein each data window includes a respective portion of the signal from each respective sensor in the plurality of sensors.

17. The gesture identification system of claim 12 wherein the at least one sensor includes N sensors, when N≥1, and wherein each window class in the library of window classes exclusively characterizes a respective region in an N-dimensional hyperspace, each dimension of the N-dimensional hyperspace representing a property of the signal from a respective one of the N sensors.

18. The gesture identification system of claim 17 wherein each region of the N-dimensional hyperspace represents a respective combination of ranges for Root Mean Square ("RMS") values of the signals from the N sensors.

19. The gesture identification system of claim 17 wherein, for each window class in the library of window classes, the corresponding region in the N-dimensional hyperspace is exclusively characterized by at least one respective angle formed in the N-dimensional hyperspace.

20. A method of operating a gesture identification system to identify a user-performed gesture, the gesture identification system including at least one sensor responsive to user-performed gestures and a processor communicatively coupled to the at least one sensor, the method comprising:
   in response to a user-performed gesture, providing at least one signal from the at least one sensor to the processor;
   segmenting the at least one signal into data windows;
   for each data window in at least a subset of the data windows, assigning a window class to the data window by the processor, each respective window class selected by the processor from a library of window classes, wherein each window class in the library of window classes exclusively characterizes at least one data window property;
   determining, by the processor, a respective probability that each gesture in a gesture library is the user-performed gesture based on the window class of at least one data window, wherein determining, by the processor, a respective probability that each gesture in a gesture library is the user-performed gesture includes:
      determining, by the processor and for each gesture in the gesture library, at least one respective transition model based on the window class of a single data window; and
      determining, by the processor and for each gesture in the gesture library, a probability that the gesture is the user-performed gesture based at least in part on the at least one transition model for the gesture;

identifying the user-performed gesture by the processor based at least in part on the window class of at least one data window, wherein identifying the user-performed gesture by the processor includes identifying, by the processor, a highest-probability gesture, the highest-probability gesture corresponding to a gesture in the gesture library that has a highest probability of being the user-performed gesture.

21. The method of claim 20 wherein the at least one sensor includes N sensors, where N≥1, and wherein each window class in the library of window classes exclusively characterizes a respective region in an N-dimensional hyperspace and each dimension of the N-dimensional hyperspace represents a property of the signal from a respective one of the N sensors.

22. The method of claim 21 wherein each region of the N-dimensional hyperspace represents a respective combination of ranges for Root Mean Square ("RMS") values of the signals from the N sensors.

23. The method of claim 21 wherein, for each window class in the library of window classes, the corresponding region in the N-dimensional hyperspace is exclusively characterized by at least one respective angle formed in the N-dimensional hyperspace.

24. The method of claim 20 wherein providing at least one signal from the at least one sensor to the processor includes providing at least one substantially continuous data stream from the at least one sensor to the processor, and wherein segmenting the at least one signal into data windows includes segmenting the at least one substantially continuous data stream into data windows in real-time by the processor.

25. The method of claim 20 wherein each window class in the library of window classes exclusively characterizes a respective range of values for the same at least one data window property.

26. The method of claim 25 wherein each window class in the library of window classes exclusively characterizes a respective range of values for at least one data window Root Mean Square ("RMS") value.

27. The method of claim 20 wherein the at least one sensor includes a plurality of sensors, and wherein:
providing at least one signal from the at least one sensor to the processor includes providing a respective signal from each respective sensor in the plurality of sensors to the processor; and
segmenting the at least one signal into data windows includes segmenting the respective signal from each respective sensor in the plurality of sensors into the data windows, wherein each data window includes a respective portion of the signal from each respective sensor in the plurality of sensors.

28. The method of claim 20 wherein the at least one sensor includes at least one muscle activity sensor selected from the group consisting of: an electromyography (EMG) sensor and a mechanomyography (MMG) sensor, and wherein:
providing at least one signal from the at least one sensor to the processor includes providing at least one signal from the at least one muscle activity sensor to the processor.

29. The method of claim 20 wherein the at least one sensor includes at least one inertial sensor selected from the group consisting of: an accelerometer, a gyroscope, and an inertial measurement unit (IMU), and wherein:
providing at least one signal from the at least one sensor to the processor includes providing at least one signal from the at least one inertial sensor to the processor.

30. The method of claim 20 wherein the gesture identification system further comprises a non-transitory processor-readable storage medium that stores processor-executable gesture identification instructions, the non-transitory processor-readable storage medium communicatively coupled to the processor, and the method further comprising: executing by the processor the gesture identification instructions to cause the processor to:
for each data window in at least a subset of the data windows, assign the window class to the data window; and
identify the user-performed gesture based at least in part on the window class of at least one data window.

31. A gesture identification system comprising:
at least one sensor responsive to physical gestures performed by a user of the gesture identification system, wherein in response to a physical gesture performed by the user the at least one sensor provides at least one signal;
a processor communicatively coupled to the at least one sensor; and
a non-transitory processor-readable storage medium communicatively coupled to the processor, wherein the non-transitory processor-readable storage medium stores processor-executable gesture identification instructions that, when executed by the processor, cause the gesture identification device to:
segment the at least one signal into data windows;
for each data window in at least a subset of the data windows, assign a window class to the data window;
determine a respective probability that each gesture in a gesture library is the physical gesture performed by the user based on the window class of at least one data window, wherein the processor-executable gesture identification instructions that, when executed by the processor, cause the gesture identification device to determine a respective probability that each gesture in a gesture library is the physical gesture performed by the user, cause the gesture identification device to:
determine, for each gesture in the gesture library, at least one respective transition model based on the window class of a single data window; and
determine, for each gesture in the gesture library, a probability that the gesture is the physical gesture performed by the user based at least in part on the at least one transition model for the gesture; and
identify the physical gesture performed by the user based at least in part on the window class of at least one data window, wherein the processor-executable gesture identification instructions that, when executed by the processor, cause the gesture identification device to identify the physical gesture performed by the user based at least in part on the window class of at least one data window, cause the gesture identification device to identify a highest-probability gesture, the highest-probability gesture corresponding to a gesture in the gesture library that has a highest probability of being the physical gesture performed by the user.

32. The gesture identification system of claim 31 wherein the at least one sensor includes a sensor selected from the group consisting of: a muscle activity sensor, an electromyography (EMG) sensor, a mechanomyography (MMG) sensor, an inertial sensor, an accelerometer, a gyroscope, an inertial measurement unit (IMU), a photosensor, an optical sensor, and an infrared sensor.

33. The gesture identification system of claim 31, further comprising:
- a wearable gesture identification device comprising a band that in use is worn on a limb of the user, wherein the at least one sensor, the processor, and the non-transitory processor-readable storage medium are all carried by the band.

34. The gesture identification system of claim 31 wherein each window class in the library of window classes exclusively characterizes a respective range of values for the same at least one data window property.

35. The gesture identification system of claim 31 wherein the at least one sensor includes N sensors, where N≥1, and wherein each window class in the library of window classes exclusively characterizes a respective region in an N-dimensional hyperspace and each dimension of the N-dimensional hyperspace represents a property of the signal from a respective one of the N sensors.

36. The gesture identification system of claim 35 wherein each region of the N-dimensional hyperspace represents a respective combination of ranges for Root Mean Square ("RMS") values of the signals from the N sensors.

37. The gesture identification system of claim 35 wherein, for each window class in the library of window classes, the corresponding region in the N-dimensional hyperspace is exclusively characterized by at least one respective angle formed in the N-dimensional hyperspace.

38. The method of claim 1 wherein determining, by the processor, at least one respective transition model for each gesture in the gesture library includes determining, by the processor and for each gesture in the gesture library, at least one respective transition model selected from the group consisting of: a unigram transition model based on the window class of the $i^{th}$ data window and a bigram transition model based on the respective window classes of the $i^{th}$ data window and a $j^{th}=(i-1)^{th}$ data window.

39. The gesture identification system of claim 12 wherein determining at least one respective transition model for each gesture in the gesture library includes determining, for each gesture in the gesture library, at least one respective transition model selected from the group consisting of: a unigram transition model based on the window class of the $i^{th}$ data window and a bigram transition model based on the respective window classes of the $i^{th}$ data window and a $j^{th}=(i-1)^{th}$ data window.

* * * * *